United States Patent
Noda

(10) Patent No.: US 9,442,278 B2
(45) Date of Patent: Sep. 13, 2016

(54) ZOOM LENS AND IMAGING APPARATUS

(71) Applicant: FUJIFILM Corporation, Tokyo (JP)

(72) Inventor: Taiga Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/539,708

(22) Filed: Nov. 12, 2014

(65) Prior Publication Data
US 2015/0131162 A1    May 14, 2015

(30) Foreign Application Priority Data
Nov. 13, 2013 (JP) ................ 2013-234860

(51) Int. Cl.
| | | |
|---|---|---|
| G02B 15/177 | (2006.01) | |
| G02B 13/04 | (2006.01) | |
| G02B 15/14 | (2006.01) | |
| G02B 15/16 | (2006.01) | |

(52) U.S. Cl.
CPC .............. G02B 15/177 (2013.01); G02B 13/04 (2013.01); G02B 15/14 (2013.01); G02B 15/16 (2013.01)

(58) Field of Classification Search
CPC .... G02B 15/177; G02B 15/14; G02B 15/16; G02B 13/04
USPC ........ 359/680–681, 695, 746, 749–750, 763, 359/770
See application file for complete search history.

(56) References Cited

U.S. PATENT DOCUMENTS

| 7,126,759 B2 * | 10/2006 | Sensui ................ G02B 15/177 |
| | | 359/680 |
| 8,085,475 B2 | 12/2011 | Miyazaki et al. |
| 8,199,411 B2 | 6/2012 | Fujimoto |
| 8,427,758 B2 | 4/2013 | Yanai et al. |
| 8,760,771 B2 | 6/2014 | Sugita |

FOREIGN PATENT DOCUMENTS

| JP | 2010-176098 | 8/2010 |
| JP | 2010-217535 | 9/2010 |
| JP | 2010-249956 | 11/2010 |
| JP | 2012-208378 | 10/2012 |
| JP | 2012-225987 | 11/2012 |

OTHER PUBLICATIONS

DE Search report, dated Jul. 8, 2015; Application No. 10 2014 016 653.8.

* cited by examiner

*Primary Examiner* — Jordan Schwartz
*Assistant Examiner* — George G King
(74) *Attorney, Agent, or Firm* — Young & Thompson

(57) ABSTRACT

A zoom lens consists of a negative first lens group, a stop, a positive second lens group, a negative third lens group, a positive fourth lens group, and a positive fifth lens group in this order from the object side. The first lens group through the fourth lens group move along the optical axis while changing magnification such that the distance between the first lens group and the second lens group is reduced and the distance between the second lens group and the third lens group is increased. The fifth lens group is fixed with respect to an image surface while changing magnification. The first lens group consists of a first lens, a second lens, a third lens, and a fourth lens in this order from the object side.

17 Claims, 12 Drawing Sheets

FIG.2
EXAMPLE 1
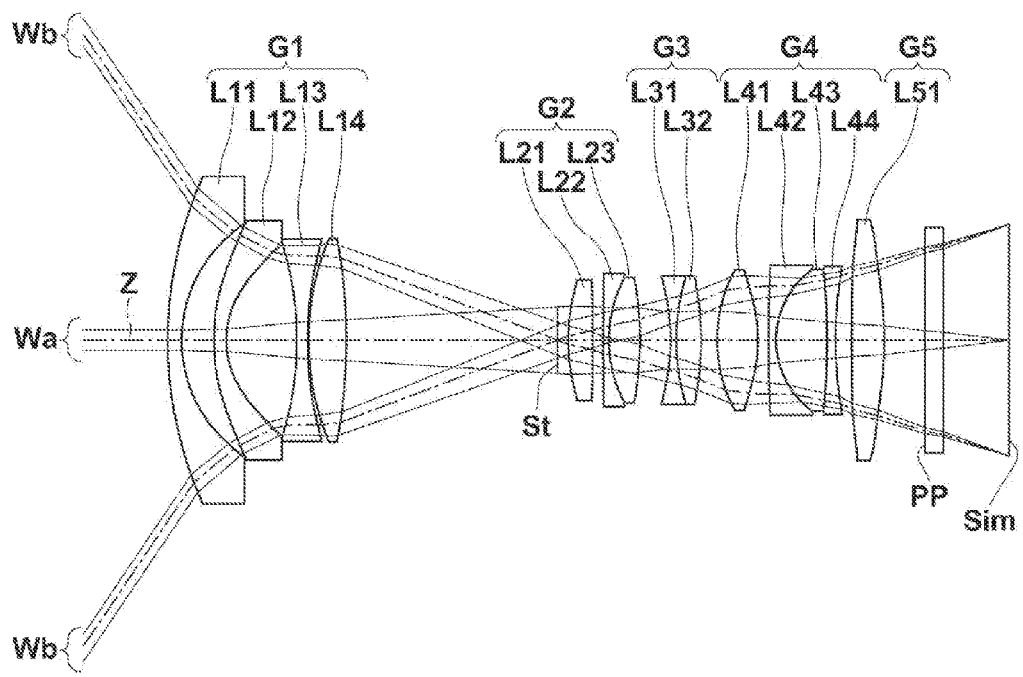
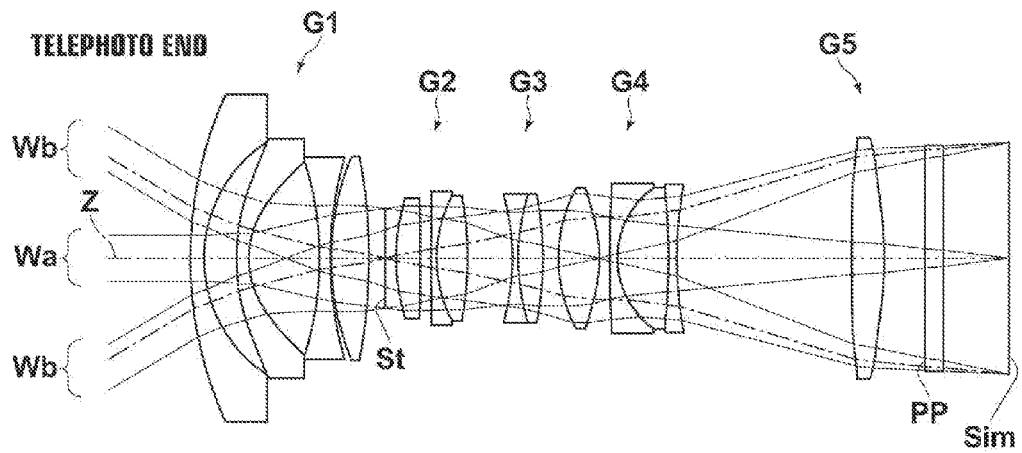

FIG.7
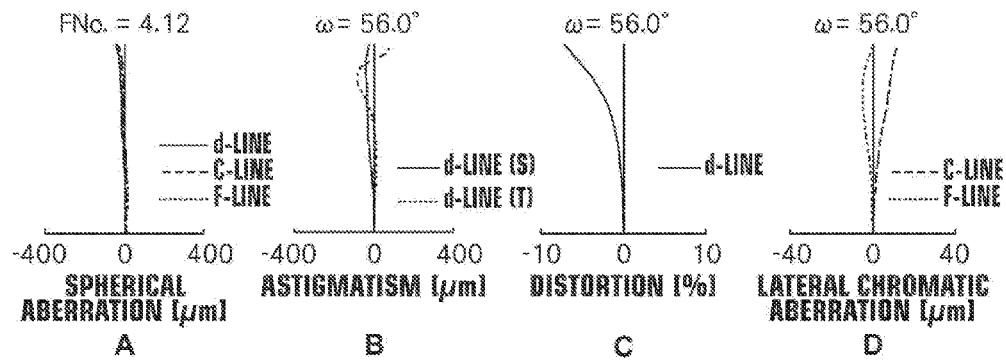
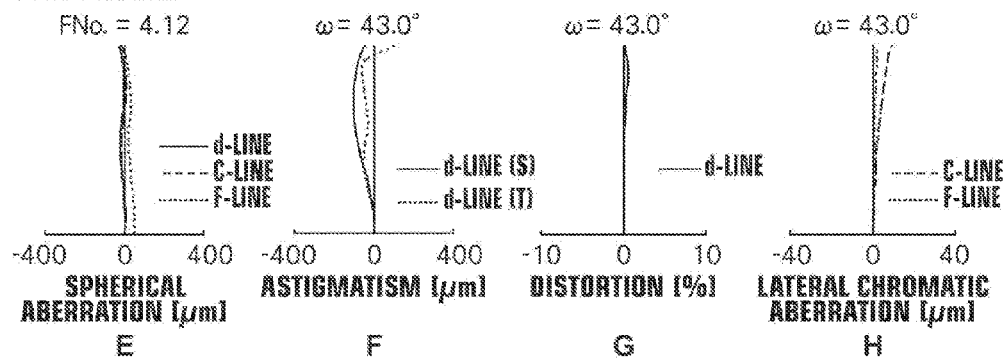
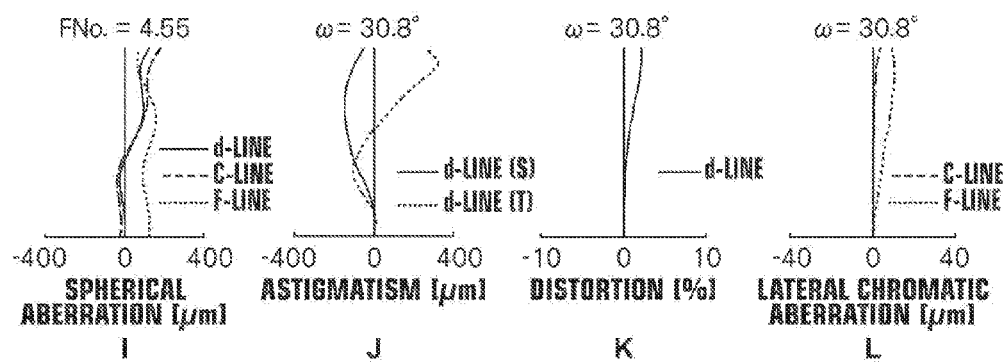

FIG.8
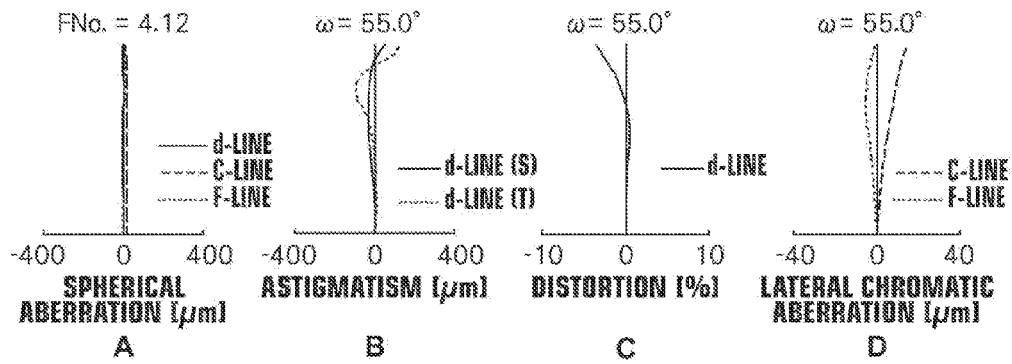
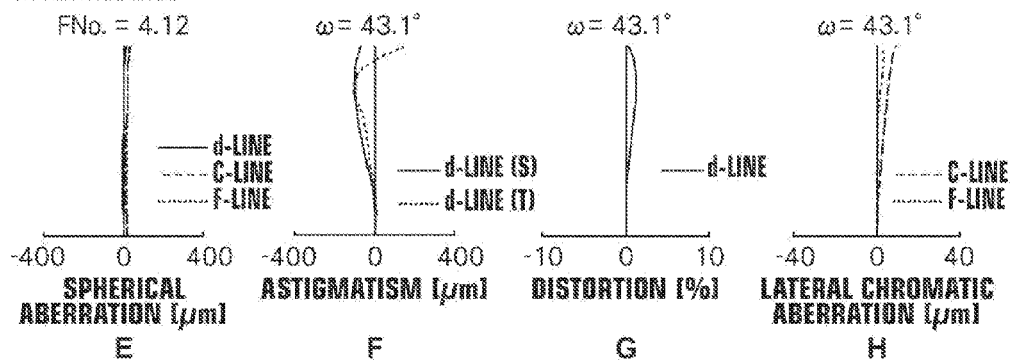
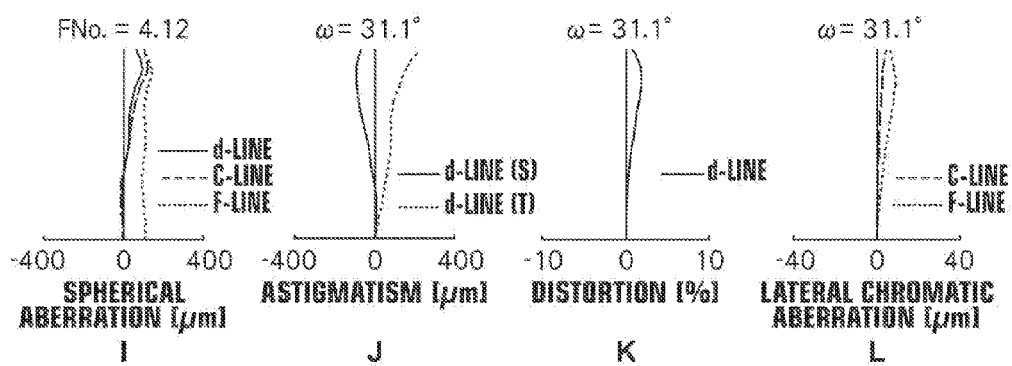

FIG.9
EXAMPLE 3
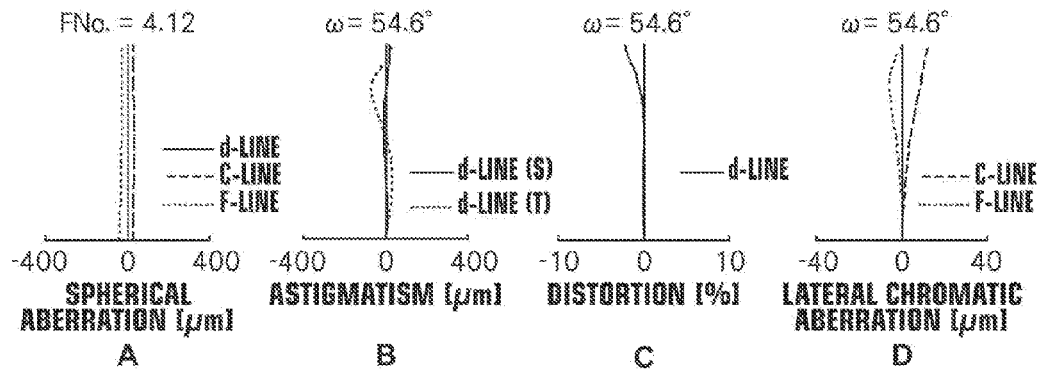
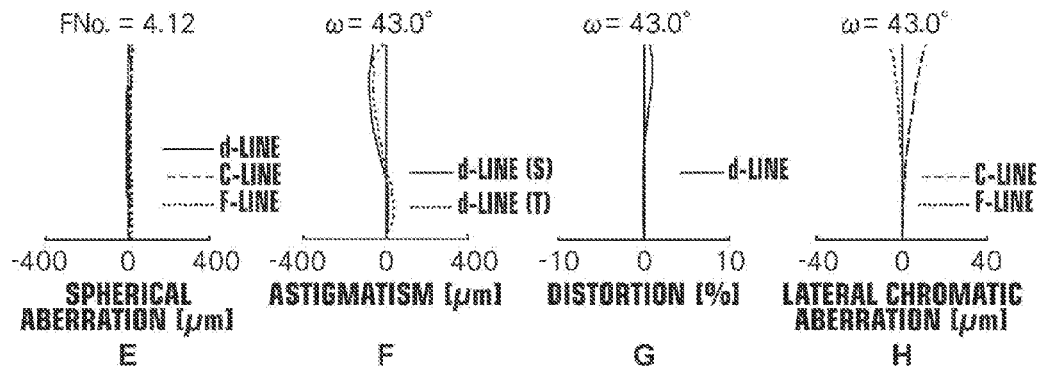
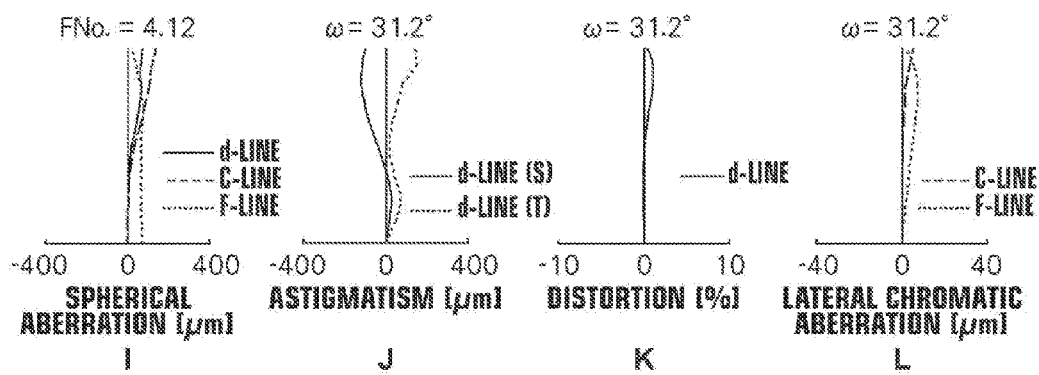

FIG.10
EXAMPLE 4
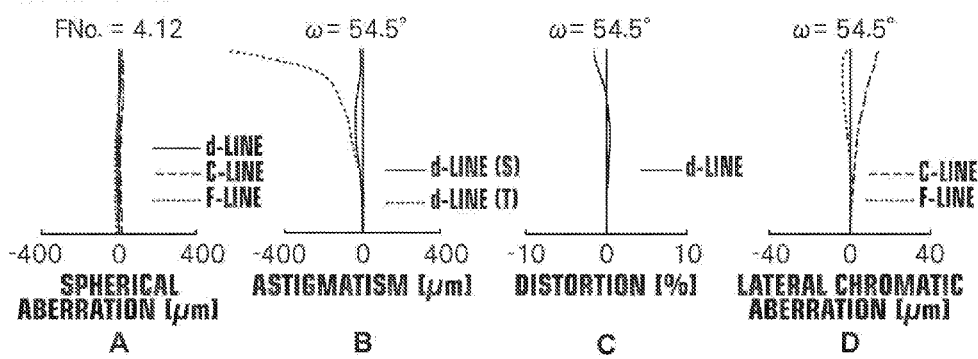
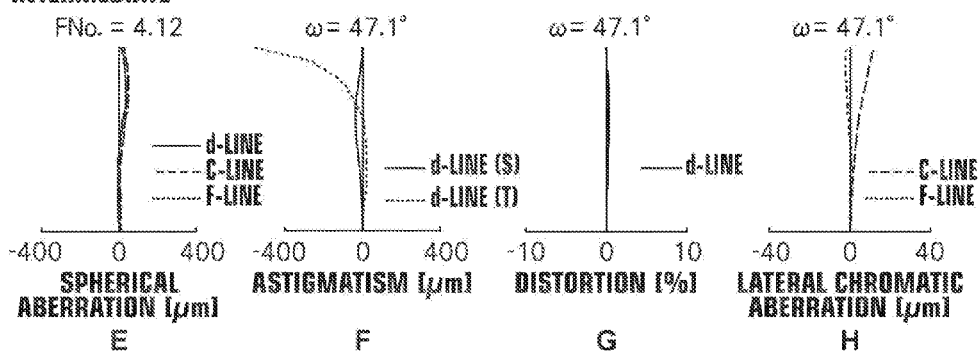
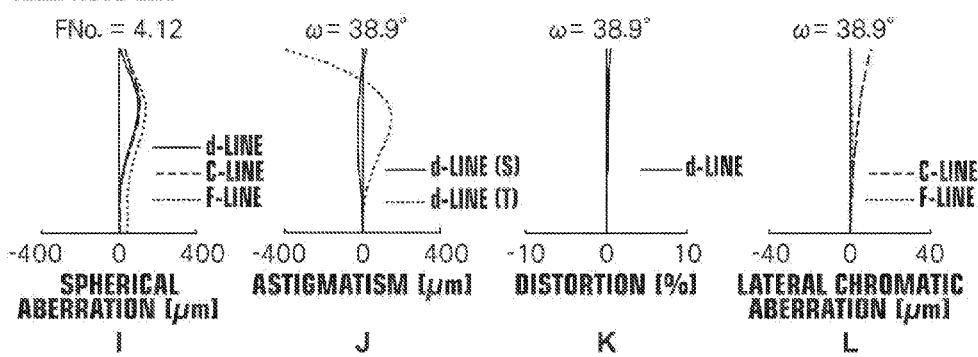

FIG.11
EXAMPLE 5
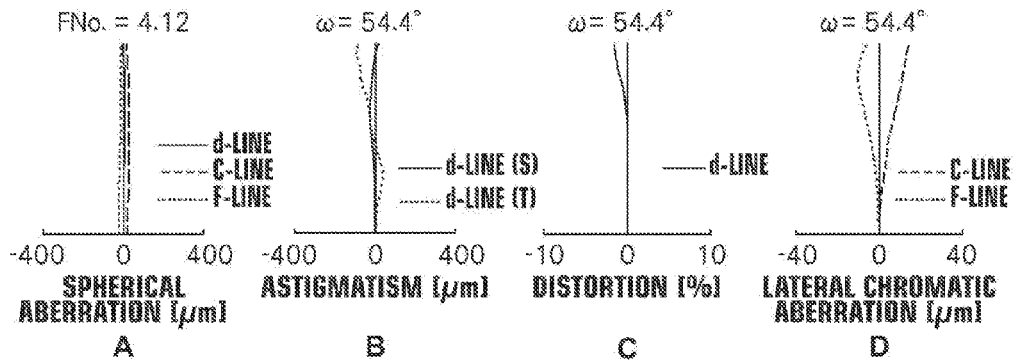
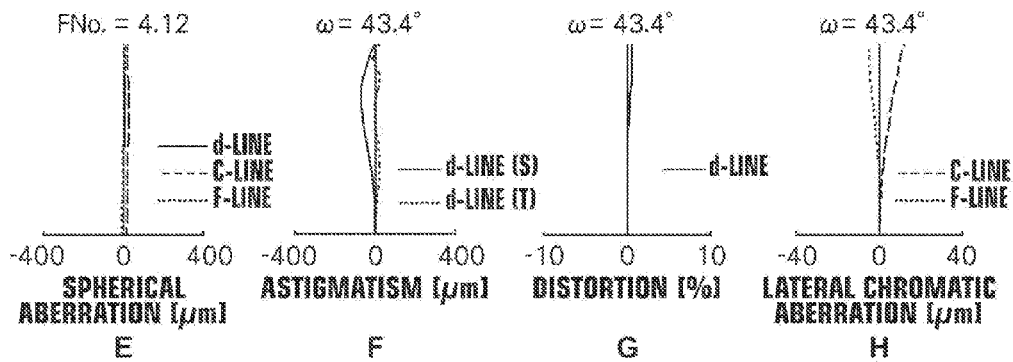
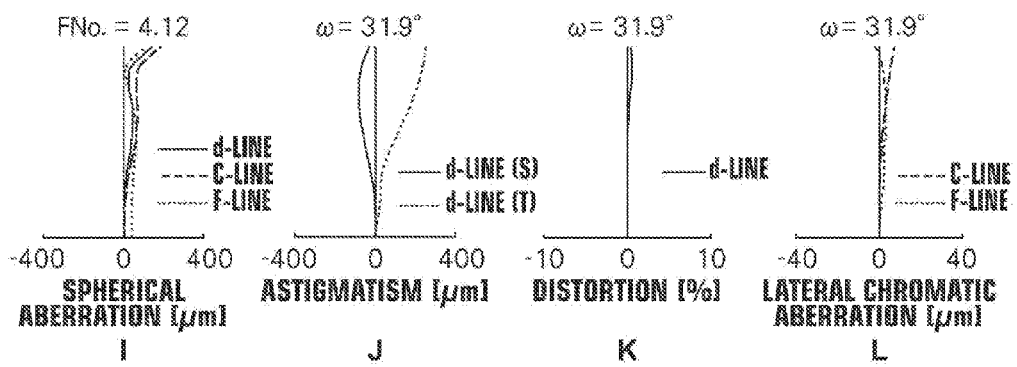

ZOOM LENS AND IMAGING APPARATUS

CROSS-REFERENCE TO RELATED APPLICATIONS

The present application claims priority under 35 U.S.C. §119 to Japanese Patent Application No. 2013-234860, filed on Nov. 13, 2013. The above application is hereby expressly incorporated by reference, in its entirety, into the present application.

BACKGROUND OF THE INVENTION

1. Technical Field

The present invention relates to a zoom lens suited for electronic cameras such as a digital camera, a video camera, a broadcasting camera, a movie camera, a surveillance camera, and the like, and to an imaging apparatus including the zoom lens.

2. Description of the Related Art

Conventionally, zoom type lenses in which a first lens group having a negative refractive power and a second lens group having a positive refractive power are arranged in front in this order from the object side are proposed as simple configurations of zoom lenses.

Further, some of those zoom type lenses, which achieve a wider angle of view as imaging lenses for interchangeable lenses to be used for lens interchangeable type cameras, are disclosed in Patent Documents 1 through 5 (Japanese Unexamined Patent Publication No. 2010-217535, Japanese Unexamined Patent Publication No. 2010-249956, Japanese Unexamined Patent Publication No. 2010-176098, Japanese Unexamined Patent Publication No. 2012-208378, and Japanese Unexamined Patent Publication No. 2012-225987). Note that forming a negative-lead type zoom lens relatively facilitates widening of the angle of view.

SUMMARY OF THE INVENTION

Accompanying the miniaturization and image-quality enhancement of digital cameras, and the like in recent years, there tends to be a demand for lenses to be compact and have high optical performance.

However, it cannot be said that the lenses disclosed in Patent Documents 1 and 2 are those which are sufficiently compact, because they have long total lengths, partly because these lenses secure a large amount of back focus.

Further, the lens disclosed in Patent Document 3 has a configuration in which a large amount of back focus is not secured. Referring to the image size of Example, the lens disclosed in Patent Document 3 is an image sensor having the diagonal line of approximately 21.63 mm. The entire lens system will be required to be proportionally enlarged in order to correspond to an APS-C type image sensor having the diagonal line of approximately 28.4 mm. This causes a problem that the lens system will be made excessively large.

Further, it cannot be said that the lenses disclosed in Patent Documents 4 and 5 are those having sufficiently wide angles of view, because they have the full angles of view of approximately 100 degrees at a maximum at the wide angle end.

The present invention has been developed in view of the above circumstances. It is an object of the present invention to provide a compact zoom lens having a short total length in which a wider angle of view is achieved and various aberrations are satisfactorily corrected, and an imaging apparatus including the lens.

A zoom lens of the present invention substantially consists of a first lens group having a negative refractive power, a stop, a second lens group having a positive refractive power, a third lens group having a negative refractive power, a fourth lens group having a positive refractive power, and a fifth lens group having a positive refractive power in this order from the object side; wherein the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;

the fifth lens group is fixed with respect to an image surface while changing magnification; and the first lens group substantially consists of a first lens having a negative refractive power, a second lens having a negative refractive power, a third lens having a negative refractive power, and a fourth lens having a positive refractive power in this order from the object side.

It is preferable for the zoom lens of the present invention to satisfy conditional formula (1) below:

$$50 < \text{vdave} < 60 \quad (1),\text{ where}$$

vdave: the mean value of the Abbe numbers of the first lens, the second lens, and the third lens with respect to the d-line (wavelength: 587.6 nm).

It is preferable for the first lens and the second lens to be of meniscus shapes with convex surfaces toward the object side and for conditional formula (2) below to be satisfied:

$$0.5 < f11/f12 < 1.7 \quad (2),\text{ where}$$

f11: the focal length of the first lens, and
f12: the focal length of the second lens.

It is preferable for the second lens to have at least one aspherical surface and for conditional formula (3) below to be satisfied:

$$1.2 < (r12f + r12r)/(r12f - r12r) < 4.8 \quad (3),\text{ where}$$

r12f: the radius of curvature of the object-side surface of the second lens, and
r12r: the radius of curvature of the image-side surface of the second lens.

It is preferable for the stop to move integrally with the second lens group while changing magnification.

It is preferable for the zoom lens to satisfy conditional formula (4) below:

$$0.15 < |f1|/f2 < 1.00 \quad (4),\text{ where}$$

f1: the focal length of the first lens group, and
f2: the focal length of the second lens group.

It is preferable for the first lens group to substantially consist of the first lens having a negative refractive power, which is of a meniscus shape with a convex surface toward the object side; the second lens having a negative refractive power, which is of a meniscus shape with a convex surface toward the object side; the third lens having a negative refractive power, which is biconcave; and the fourth lens having a positive refractive power, which is biconvex in this order from the object side.

It is preferable for the zoom lens to satisfy conditional formula (5) below:

$$0.8 < D12w/|f1| < 1.5 \quad (5),\text{ where}$$

D12w: the distance between the most-image-side-surface apex of the first lens group at the wide angle end and the most-object-side-surface apex of the second lens group at the wide angle end, and f1: the focal length of the first lens group.

It is preferable for the zoom lens to satisfy conditional formula (6) below:

$$0.05 < X2/f2 < 1.20 \quad (6),$$

where

X2: the amount of movement of the second lens group from the wide angle end to the telephoto end, and
f2: the focal length of the second lens group.

It is preferable for the zoom lens to satisfy conditional formula (7) below:

$$50 < \omega \quad (7),$$

where

ω: a half angle of view (degree) at the wide angle end.

It is preferable for the zoom lens to satisfy conditional formula (1-1) below:

$$55 < vdave < 58 \quad (1\text{-}1).$$

Further, it is preferable for the first lens and the second lens to be of meniscus shapes with convex surfaces toward the object side and for conditional formula (2-1) below to be satisfied:

$$0.6 < f11/f12 < 1.6 \quad (2\text{-}1).$$

Further, it is preferable for the second lens to have at least one aspherical surface and for conditional formula (3-1) below to be satisfied.

$$1.6 < (r12f + r12r)/(r12f - r12r) < 4.4 \quad (3\text{-}1).$$

Further, it is preferable for the zoom lens to satisfy conditional formula (4-1) below:

$$0.25 < |f1|/f2 < 0.90 \quad (4\text{-}1).$$

Further, it is preferable for the zoom lens to satisfy conditional formula (5-1) below:

$$0.9 < D12w/|f1| < 1.4 \quad (5\text{-}1).$$

Further, it is preferable for the zoom lens to satisfy conditional formula (6-1) below:

$$0.10 < X2/f2 < 1.00 \quad (6\text{-}1).$$

An imaging apparatus of the present invention is provided with the zoom lens of the present invention described above.

Note that the above expression "substantially consists of" intends to include a lens that includes lenses substantially without any refractive power; optical elements other than lenses such as stops, masks, glass covers, and filters; lens flanges; lens barrels; imaging elements; and mechanical components such as camera shake correction mechanisms; in addition to the lens groups listed above as constituent elements.

The surface shapes and the signs of the refractive powers of the above lens should be considered in paraxial regions if aspheric surfaces are included therein.

A zoom lens of the present invention substantially consists of a first lens group having a negative refractive power, a stop, a second lens group having a positive refractive power, a third lens group having a negative refractive power, a fourth lens group having a positive refractive power, and a fifth lens group having a positive refractive power in this order from the object side; wherein the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;

the fifth lens group is fixed with respect to an image surface while changing magnification; and the first lens group substantially consists of a first lens having a negative refractive power, a second lens having a negative refractive power, a third lens having a negative refractive power, and a fourth lens having a positive refractive power in this order from the object side. This enables a compact zoom lens having a short total length to be realized, in which the full angle of view is approximately 110 degrees, which is a wide angle of view, and various aberrations are satisfactorily corrected.

As the imaging apparatus of the present invention include the zoom lens of the present invention, miniaturization can be achieved and a high quality video image can be obtained.

BRIEF DESCRIPTION OF THE DRAWINGS

FIG. 2 is a collection of view illustrating optical paths of a zoom lens according to one embodiment (which is the same as Example 1).

FIG. 7 shows aberration diagrams A through L of the zoom lens according to Example 1 of the present invention.

FIG. 8 shows aberration diagrams A through L of the zoom lens according to Example 2 of the present invention.

FIG. 9 shows aberration diagrams A through L of the zoom lens according to Example 3 of the present invention.

FIG. 10 shows aberration diagrams A through L of the zoom lens according to Example 4 of the present invention.

FIG. 11 shows aberration diagrams A through L of the zoom lens according to Example 5 of the present invention.

DESCRIPTION OF THE PREFERRED EMBODIMENTS

Figure 1:
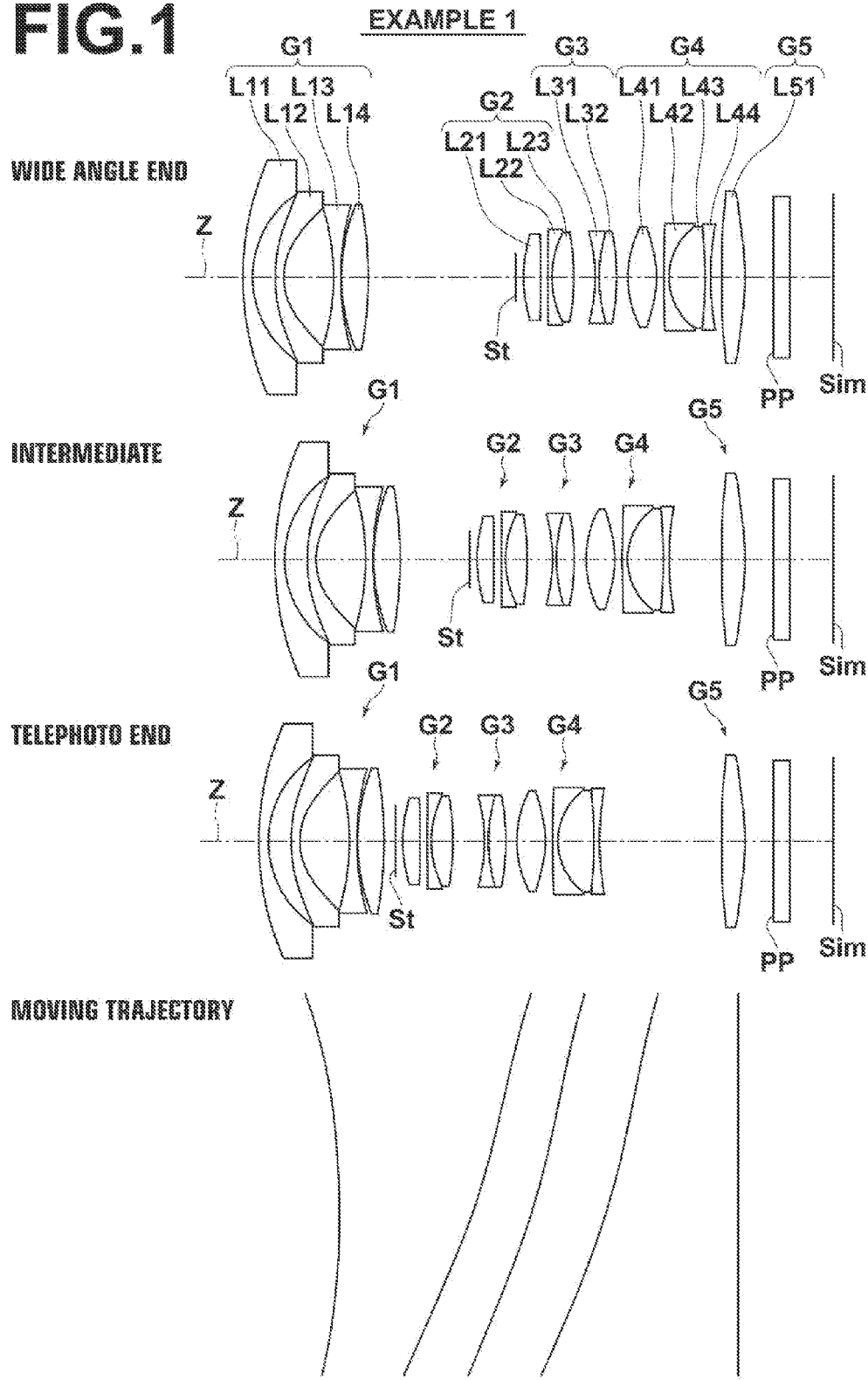
FIG. 1 is a collection of cross-sectional views of a zoom lens according to one embodiment (which is the same as Example 1) of the present invention, illustrating the lens configuration thereof.

Hereinafter, embodiments of the present invention will be described in detail with reference to the accompanying drawings. FIG. 1 is a collection of cross-sectional views of a zoom lens according to one embodiment of the present invention, illustrating the lens configuration thereof. FIG. 2 is a collection of views illustrating optical paths of the zoom lens described above. The example of a configuration shown in each of FIGS. 1 and 2 is the same as the configuration of the zoom lens of Example 1 to be described later. In FIGS. 1 and 2, the left side is the object side, and the right side is the image side. In addition, FIG. 2 also shows axial rays wa and rays wb having the maximum angle of view.

As shown in FIGS. 1 and 2, this zoom lens consists of a first lens group G1 having a negative refractive power, a stop St, a second lens group G2 having a positive refractive power, a third lens group G3 having a negative refractive power, a fourth lens group G4 having a positive refractive power, and a fifth lens group G5 having a positive refractive power along the optical axis Z in this order from the object side. Note that the stop St does not necessarily represent the size or shape thereof, but represents the position thereof on the optical axis Z.

When this zoom lens is applied to the imaging apparatus, it is preferable for a cover glass, a prism, various types of filters, such as an infrared cut filter, a low-pass filter, and the like to be provided between the optical system and the image surface Sim according to the configurations of a camera on which the lens is mounted. Each of FIGS. 1 and 2 illustrates an example in which a plane parallel optical member PP that presumes such components is provided between the lens system and the image surface Sim.

Such a configuration enables a wider angle of view and miniaturization of the lens system to be achieved. Further, arranging the fifth lens group G5 having a positive refractive power is advantageous from the viewpoint from shortening the total length and reducing the angle of rays entering the image formation plane. In addition, disposing the stop St relatively in front within the entire lens is advantageous from the viewpoint of miniaturizing the lens because the radial length of the first lens group G1 can be reduced although the lens has a wide angle of view.

Further, the zoom lens of the present embodiment is configured in such a manner that the first lens group G1 through the fourth lens group G4 move along the optical axis Z while changing magnification from the wide angle end to the telephoto end so as to change the distances among one another such that the distance between the first lens group G1 and the second lens group G2 is reduced and the distance between the second lens group G2 and the third lens group G3 is increased; and the fifth lens group G5 is fixed with respect to the image surface while changing magnification.

Configuring the first lens group G1 through the fourth lens group G4 while changing magnification in such a manner as described above can reduce the amount of movement of each lens group while changing magnification. Thereby, the length of a tube of a lens barrel can be reduced and miniaturization of the lens can be achieved while securing a zoom ratio, leading to suppressing forward movement of the position of the stop at the telephoto end. Therefore, a fast lens having a small F number even at the telephoto end can be achieved. Further, the fifth lens group G5 is fixed with respect to the image surface while changing magnification. This is advantageous from the viewpoint from attaining telecentricity. In addition, it is possible to expect the advantageous effect such that dust and the like are prevented from entering the interior of the lens barrel.

Further, the first lens group G1 of the zoom lens of the present embodiment consists of a first lens L11 having a negative refractive power, a second lens L12 having a negative refractive power, a third lens L13 having a negative refractive power, and a fourth lens L14 having a positive refractive power in this order from the object side.

Such a configuration enables satisfactory correction of distortion and astigmatism which occur within the first lens group G1 because there is no need to forcibly bend rays of light.

In the zoom lens of the present embodiment, it is preferable for conditional formula (1) below to be satisfied. Setting the value of vdave so as not to fall below the lower limit defined by conditional formula (1) can suppress the amount of lateral chromatic aberration which occurs within the first lens group G1. Further, setting the value of vdave so as not exceed the upper limit defined by conditional formula (1) can secure a wider angle of view without increasing curvature of lenses. Therefore, the first lens L11, the second lens L12, and the third lens L13 can be miniaturized. Note that satisfying conditional formula (1-1) below realizes more favorable characteristics.

$$50 < vdave < 60 \quad (1)$$

$$55 < vdave < 58 \quad (1\text{-}1), \text{ where}$$

vdave: the mean value of the Abbe numbers of the first lens, the second lens, and the third lens with respect to the d-line (wavelength: 587.6 nm).

It is preferable for the first lens L11 and the second lens L12 to be of meniscus shapes with convex surfaces toward the object side and for conditional formula (2) below to be satisfied. Configuring both the first lens L11 and the second lens L12 in such a manner as described above enables achievement of a wider angle of view. Further, this is advantageous from the viewpoint of suppressing the occurrence of field curvature, particularly field curvature in the sagittal direction. Setting the value of f11:/f12: so as not to fall below the lower limit defined by conditional formula (2) can suppress the negative power of the first lens L11, thereby decreasing astigmatism which occurs in the first lens L11. Therefore, the burden of suppressing aberrations on the following lenses can be reduced. Further, setting the value of f11:/f12: so as not to exceed the upper limit defined by conditional formula (2) can suppress the negative power of the second lens L12 and decrease enlargement of the angle of view of rays at the front thereof, thereby enabling a reduction of the outer diameter of the first lens L11. Note that satisfying conditional formula (2-1) below realizes more favorable characteristics.

$$0.5 < f11/f12 < 1.7 \quad (2)$$

$$0.6 < f11/f12 < 1.6 \quad (2\text{-}1), \text{ where}$$

f11:: the focal length of the first lens, and
f12:: the focal length of the second lens.

It is preferable for the second lens L12 to have at least one aspherical surface and for conditional formula (3) below to be satisfied. Providing the second lens L12 with an aspherical surface enables satisfactory correction of distortion. Further, in this case, it is possible to provide an aspherical surface on a lens having a small outer diameter. Therefore, a relatively low cost configuration can be provided and manufacturing difficulties can be suppressed, compared to a case that the first lens L11 is provided with an aspherical surface. Further, setting the value of $(r12f+r12r)/(r12f-r12r)$ so as not to fall below the lower limit defined by conditional formula (3) causes the second lens L12 to have a relatively small concave surface toward the side of the first lens. This facilitates satisfactory correction of astigmatism. Further, an increase in the size of the first lens L11 can be suppressed so as to meet a demand for securing a space between the first lens L11 and the second lens L12. Moreover, setting the value of $(r12f+r12r)/(r12f-r12r)$ so as not to exceed the upper limit defined by conditional formula (3) enables keeping a good balance between the third lens L13 and the fourth lens L14 and suppressing the occurrence of lateral chromatic aberration. Note that satisfying conditional formula (3-1) below realizes more favorable characteristics.

$$1.2 < (r12f + r12r)/(r12f - r12r) < 4.8 \quad (3)$$

$$1.6 < (r12f + r12r)/(r12f - r12r) < 4.4 \quad (3\text{-}1), \text{ where}$$

r12f:: the radius of curvature of the object-side surface of the second lens, and
r12r:: the radius of curvature of the image-side surface of the second lens.

Further, it is preferable for the stop St to move integrally with the second lens group G2 while changing magnification. Such a configuration advantageously makes the mechanism within the lens barrel simple and reduces the radial lengths of the lens groups on the image side from the stop St.

Further, it is preferable for conditional formula (4) below to be satisfied. Setting the value of |f1|/f2so as not to fall below the lower limit defined by conditional formula (4) can suppress an increase in the power of the first lens group G1. Thereby, the occurrence of field curvature can be suppressed. Further, setting the value of |f1|/f2so as not to exceed the upper limit defined by conditional formula (4) can suppress an increase in the power of the second lens group G2. Thereby, the occurrence of spherical aberration can be suppressed and achievement of a wider angle of view will be facilitated. Note that satisfying conditional formula (4-1) below realizes more favorable characteristics.

$$0.15 < |f1|/f2 < 1.00 \quad (4)$$

$$0.25 < |f1|/f2 < 0.90 \quad (4\text{-}1), \text{ where}$$

f1: the focal length of the first lens group, and
f2: the focal length of the second lens group.

It is preferable for the first lens group G1 to consist of the first lens L11 having a negative refractive power, which is of a meniscus shape with a convex surface toward the object side; the second lens having a negative refractive power, which is of a meniscus shape with a convex surface toward the object side; the third lens L13 having a negative refractive power, which is biconcave; and the fourth lens L14 having a positive refractive power, which is biconvex in this order from the object side. Such a configuration enables satisfactory correction of distortion and astigmatism which occur within the first lens group and reduces the sensitivity with respect to manufacturing errors within the first lens group G1 although the lens has a super wind angle of view.

It is preferable for conditional formula (5) to be satisfied. Setting the value of D12w/|f1| so as not to fall below the lower limit defined by conditional formula (5) can secure a moving space of the second lens group G2 which has a main magnification change action and facilitates securing a zoom ratio. Consequently, reduction in the size of the lens barrel can be achieved. Further, setting the value of D12w/|f1| so as not to exceed the upper limit defined by conditional formula (5) can prevents the stop St and the first lens group G1 from moving too far away from each other. Accordingly, the increase in the radial length of the first lens group can be suppressed. Note that satisfying conditional formula (5-1) below realizes more favorable characteristics.

$$0.8 < D12w/|f1| < 1.5 \quad (5)$$

$$0.9 < D12w/|f1| < 1.4 \quad (5\text{-}1), \text{ where}$$

D12w: the distance between the most-image-side-surface apex of the first lens group at the wide angle end and the most-object-side-surface apex of the second lens group at the wide angle end, and
f1: the focal length of the first lens group.

It is preferable for conditional formula (6) below to be satisfied. Setting the value of X2:/f2so as not to fall below the lower limit defined by conditional formula (6) enables the amount of movement of the second lens group G2 which has a main magnification change action to be secured. Therefore, a zoom ratio can be increased. Further, setting the value of X2:/f2so as not to exceed the upper limit defined by conditional formula (6) can prevent the stop St which is disposed anterior to the second lens group G2 from departing from the image formation plane. Accordingly, a fast lens having a small F number at the telephoto end can be provided. Note that satisfying conditional formula (6-1) below realizes more favorable characteristics.

$$0.05 < X2/f2 < 1.20 \quad (6)$$

$$0.10 < X2/f2 < 1.00 \quad (6\text{-}1), \text{ where}$$

X2:: the amount of movement of the second lens group from the wide angle end to the telephoto end, and
f2: the focal length of the second lens group.

It is preferable for conditional formula (7) below to be satisfied. Setting the value of co so as not to fall below the lower limit defined by conditional formula (7) enables a sufficient angle of view to be secured.

$$50 < \omega \quad (7), \text{ where}$$

ω: a half angle of view (degree) at the wide angle end.

In the present zoom lens, as a material disposed on the most-object side, in particular, a glass is preferably used, or a transparent ceramic may be employed.

Moreover, in the case that the present zoom lens is used in environments in which lenses are easily damaged, it is preferable for a multi-layer film coating for protection to be applied onto lenses. Moreover, in addition to a coating for protection, an antireflection coating may be applied onto lenses so as to reduce ghost light, and the like when using the lenses.

In the example of FIG. 1, the optical member PP is disposed between the lens system and the image surface Sim. Instead of disposing a low-pass filter, various kinds of filters which cut specific wavelength ranges, and the like between the lens system and the image surface Sim, these various kinds of filters may be disposed between lenses, or a coating, which exhibits the same effects as the various kinds of filters, may be applied onto the lens surfaces of any of the lenses.

Next, Numerical Examples of the zoom lens of the present invention will be described.

First, the zoom lens of Example 1 will be described. A collection of cross-sectional views of a zoom lens according to Example 1 illustrating the lens configuration thereof is shown in FIG. 1. Note that in FIG. 1, and FIGS. 2 through 5 respectively corresponding to Examples 3 through 6 to be described later, an optical member PP is also shown, and the left side is the object side and the right side is the image side. Further, the stop St shown in the Figures does not necessarily represent the size or shape thereof, but represents the position thereof on the optical axis Z.

Basic lens data of the zoom lens of Example 1 is shown in Table 1, data related to specs is shown in Table 2, data related to the distances between surfaces which move is shown in Table 3, and data related to aspherical surface coefficients is shown in Table 4. The meanings of the symbols in the Tables will be described below with reference to Example 1 as an example. The same basically applies to Examples 2 through 5.

In the lens data of Table 1, the i-th (i=1, 2, 3, . . . ) surface number, the value of i sequentially increasing from the surface of the constituent element at the most object side, which is designated as 1, toward the image side are shown in the column Si. The radii of curvature of the i-th surface are shown in the column Ri, and the distances between i-th surfaces and (i+1)st surfaces along the optical axis Z are shown in the column di. Further, the refractive indices of j-th (j=1, 2, 3, . . . ) optical elements with respect to the d-line (wavelength: 587.6 nm), the value of j sequentially increasing from the optical element at the most magnification side, which is designated as 1, toward the reduction side, are shown in the column ndj. The Abbe numbers of j-th optical elements with respect to the d-line (wavelength: 587.6 nm) are shown in the column vdj.

Here, the sign of the radius of curvature is positive in the case that a surface shape is convex on the object side, and negative in the case that the surface shape is convex on the image side. Basic lens data also shows a stop St and an optical member PP. The column of the surface number of a surface which corresponds to the stop St shows a surface number together with the word "stop". Moreover, in the lens data of Table 1, the column of each of the distances between surfaces that vary while changing magnification shows DD [i]. The value of the bottom column of di is the distance between an image-side surface from the optical member PP and the image surface Sim.

Data related to specs at Table 2 shows the zoom ratio, the focal length f, the back focus Bf, the F-number FNo. and the full angle view 2ω of each of at the wide angle end, the intermediate, and the telephoto end.

In the basic lens data, data related to specs, and data related to the distances between surfaces which move, degrees are used as the unit of angles and mm is used as the unit of length, but other appropriate units may also be used, as optical systems are usable even when they are proportionally enlarged or miniaturized.

In the lens data of Table 1, the mark "*" is indicated at surface numbers of aspherical surfaces. Numerical values of paraxial radii of curvature are indicated as the radii of curvature of the aspherical surfaces. The data related to aspherical surface coefficients of Table 4 show surface numbers Si of aspheric surfaces, and aspherical surface coefficients with respect to these aspheric surfaces. The aspherical surface coefficients shows values of respective coefficients KA, Am (m=3, 4, 5, . . . 12) in the aspherical surface expression (A) below.

$$Zd = C \cdot h^2 / \{1 + (1 - KA \cdot C^2 \cdot h^2)^{1/2}\} + \Sigma Am \cdot h^m \quad (B)$$

where,

Zd: the depth of an aspheric surface (the length of a perpendicular line drawn from a point on an aspheric surface with a height h to a plane perpendicular to the optical axis which contacts the peak of the aspheric surface)
h: height (the distance from the optical axis)
C: an inverse number of a paraxial radius of curvature
KA, Am: aspherical surface coefficients (m=3, 4, 5, . . . 12).

TABLE 1

Example 1 Lens Data (n, v is d-line)

| Si (Surface Numbers) | Ri (Radii of Curvature) | di (Distances Between Surfaces) | ndj (Refractive Ratios) | vdj (Abbe Numbers) |
|---|---|---|---|---|
| 1 | 48.9076 | 1.7000 | 1.754999 | 52.32 |
| 2 | 17.1234 | 4.0000 | | |
| *3 | 35.6783 | 1.5000 | 1.740250 | 49.12 |
| *4 | 11.9671 | 8.6800 | | |
| 5 | −39.7818 | 1.3000 | 1.592824 | 68.63 |
| 6 | 44.8286 | 0.1000 | | |
| 7 | 32.2764 | 4.6700 | 1.882997 | 40.76 |
| 8 | −67.7357 | DD[8] | | |
| 9 (stop) | ∞ | 1.3000 | | |
| *10 | 22.3243 | 3.0000 | 1.581029 | 59.23 |
| *11 | −3623.6878 | 1.3000 | | |
| 12 | 577.6778 | 0.7100 | 1.816000 | 46.62 |
| 13 | 16.6190 | 3.8000 | 1.733937 | 51.47 |
| 14 | −41.8885 | DD[14] | | |
| 15 | −27.9410 | 0.7100 | 1.772499 | 49.60 |
| 16 | 26.1820 | 3.0600 | 1.496999 | 81.54 |
| 17 | −39.8440 | DD[17] | | |
| *18 | 18.4297 | 5.0000 | 1.497103 | 81.56 |
| *19 | −17.5629 | 1.3000 | | |
| 20 | 220.7677 | 0.9100 | 1.804000 | 46.58 |
| 21 | 10.6520 | 6.3000 | 1.496999 | 81.54 |
| 22 | −83.5500 | 1.0000 | 1.696797 | 55.53 |
| 23 | 49.9738 | DD[23] | | |
| *24 | 416.7292 | 4.0000 | 1.693500 | 53.18 |
| *25 | −48.3381 | 5.0000 | | |
| 26 | ∞ | 2.8500 | 1.516798 | 64.20 |
| 27 | ∞ | 7.6391 | | |

TABLE 2

Example 1 Specs (the d-line)

| | Wide Angle End | Intermediate | Telephoto End |
|---|---|---|---|
| Zoom Ratios | 1.0 | 1.5 | 2.3 |
| f | 10.33 | 15.20 | 23.36 |
| Bf (in air) | 14.52 | 14.52 | 14.52 |
| FNo. | 4.12 | 4.12 | 4.12 |
| 2ω[°] | 112.0 | 86.0 | 61.6 |

TABLE 3

Example 1 Distances Associated With Zooming

| | Wide Angle End | Intermediate | Telephoto End |
|---|---|---|---|
| DD[8] | 25.91 | 12.14 | 1.97 |
| DD[14] | 3.75 | 4.44 | 5.50 |
| DD[17] | 1.97 | 2.14 | 1.90 |
| DD[23] | 2.00 | 9.28 | 21.46 |

TABLE 4

Example 1 Aspherical Surface

| | Surface Numbers | | |
|---|---|---|---|
| | 3 | 4 | 10 |
| KA | 1.0000000E+00 | −3.2984320E+00 | 1.0000000E+00 |
| A3 | 0.0000000E+00 | −4.4558881E−06 | 0.0000000E+00 |
| A4 | 2.5843180E−04 | 5.5484444E−04 | 1.9450862E−06 |
| A5 | −7.8805637E−06 | −1.2840395E−05 | −2.6510883E−05 |
| A6 | −3.5980953E−06 | −4.0404631E−06 | 9.2762597E−06 |
| A7 | 1.6095961E−07 | −2.0257653E−07 | −1.0108176E−06 |
| A8 | 2.2978051E−08 | 4.3385992E−08 | −1.3268194E−07 |

TABLE 4-continued

Example 1 Aspherical Surface

| | | | |
|---|---|---|---|
| A9 | −1.5416422E−09 | 2.0356520E−09 | 3.3304332E−08 |
| A10 | −4.0438312E−11 | −2.8487869E−11 | −6.2858817E−10 |
| A11 | 5.0566122E−12 | −3.3536803E−12 | −2.6696016E−10 |
| A12 | −9.9545849E−14 | 5.6528700E−13 | 1.4450909E−11 |

| | Surface Numbers | | |
|---|---|---|---|
| | 11 | 18 | 19 |
| KA | 1.0000000E+00 | 1.0000000E+00 | 1.0000000E+00 |
| A3 | 0.0000000E+00 | 0.0000000E+00 | 0.0000000E+00 |
| A4 | 4.3055171E−05 | 1.3578295E−05 | 8.3287140E−05 |
| A5 | −4.7563942E−05 | −9.1406993E−06 | 9.4589682E−06 |
| A6 | 1.5741695E−05 | 5.1811411E−07 | −3.5236718E−06 |
| A7 | −1.3970041E−06 | 3.2116393E−07 | 5.8093125E−07 |
| A8 | −3.3239681E−07 | −3.7667873E−08 | −1.2202069E−09 |
| A9 | 6.9972366E−08 | −3.1136060E−09 | −9.8162042E−09 |
| A10 | −5.4620266E−10 | 5.4785448E−10 | 6.9266610E−10 |
| A11 | −7.1336476E−10 | 8.4337876E−12 | 4.3240880E−11 |
| A12 | 4.1858983E−11 | −2.3865100E−12 | −4.4223065E−12 |

| | Surface Numbers | |
|---|---|---|
| | 24 | 25 |
| KA | 1.0000000E+00 | 1.0000000E+00 |
| A3 | 0.0000000E+00 | 0.0000000E+00 |
| A4 | −1.4524716E−04 | −1.0149458E−04 |
| A5 | 4.0453268E−05 | 1.7019957E−05 |
| A6 | −3.4384459E−06 | 1.5504919E−06 |
| A7 | −1.8524677E−08 | −4.6722636E−07 |
| A8 | 1.8204920E−08 | 2.4336798E−08 |
| A9 | −3.5828397E−10 | 1.3179759E−09 |
| A10 | −4.3555141E−11 | −1.3035736E−10 |
| A11 | 4.8895266E−13 | −1.3218710E−13 |
| A12 | 5.6568011E−14 | 1.4069497E−13 |

Aberration diagrams of the zoom lens of Example 1 are shown in A through L of FIG. 7. A through D of FIG. 7 respectively show spherical aberration, astigmatism, distortion, and lateral chromatic aberration at infinity at the wide angle end; E through H of FIG. 7 respectively show spherical aberration, astigmatism, distortion, and lateral chromatic aberration at infinity at the intermediate; and I through L of FIG. 7 respectively show spherical aberration, astigmatism, distortion, and lateral chromatic aberration at infinity at the telephoto end.

The aberration diagrams respectively showing spherical aberration, astigmatism, and distortion represents the d-line (a wavelength of 587.6 nm) as a reference wavelength. The spherical aberration diagram shows aberrations with respect to the d-line (a wavelength of 587.6 nm), the C-line (a wavelength of 656.3 nm), and the F-line (a wavelength of 486.1 nm) respectively indicated by a solid line, a broken line, and a dotted line. In the astigmatism diagrams, the solid line illustrates astigmatism in the sagittal direction while the dotted line illustrates astigmatism in the tangential direction. In the lateral chromatic aberration diagram, aberrations with respect to the C-line (a wavelength of 656.3 nm) and the F-line (a wavelength of 486.1 nm) are respectively indicated by a broken line and a dotted line. Note that in spherical aberration diagrams, Fno. refers to a F-number, and in the other aberration diagrams, ω refers to a half angle of view.

Figure 3:
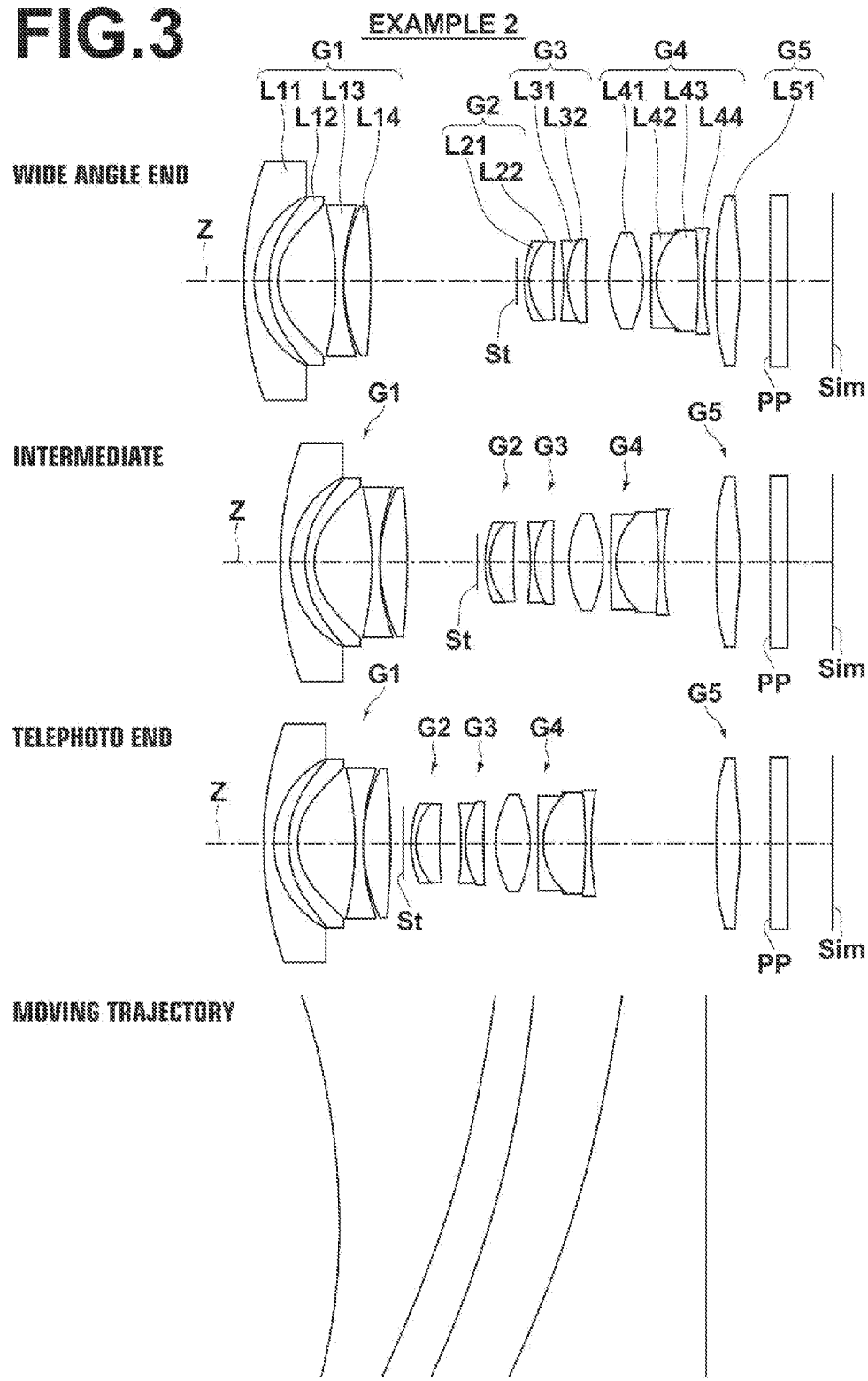
FIG. 3 is a collection of cross-sectional views of a zoom lens according to Example 2 of the present invention, illustrating the lens configuration thereof.

Next, a zoom lens of Example 2 will be described. FIG. 3 shows a collection of cross-sectional views of the zoom lens of Example 2, illustrating the lens configuration thereof. Moreover, basic lens data of the zoom lens of Example 2 are shown in Table 5, data related to specs thereof are shown in Table 6, data related to the distances between surfaces which move thereof are shown in Table 7, data related to aspherical surface coefficients are shown in Table 8, and the respective aberration diagrams are shown in A through L of FIG. 8.

TABLE 5

Example 2 Lens Data (n, ν is d-line)

| Si (Surface Numbers) | Ri (Radii of Curvature) | di (Distances Between Surfaces) | ndj (Refractive Ratios) | Ndj (Abbe Numbers) |
|---|---|---|---|---|
| 1 | 56.7618 | 1.7000 | 1.754999 | 52.32 |
| 2 | 15.3482 | 2.4999 | | |
| *3 | 18.5184 | 1.5000 | 1.743300 | 49.33 |
| *4 | 10.9720 | 9.5826 | | |
| 5 | −49.5242 | 1.3000 | 1.592824 | 68.63 |
| 6 | 34.7691 | 0.0999 | | |
| 7 | 28.2554 | 4.5000 | 1.882997 | 40.76 |
| 8 | −116.5319 | DD[8] | | |
| 9 (stop) | ∞ | 1.3000 | | |
| 10 | 16.7654 | 0.8102 | 1.738000 | 32.26 |
| 11 | 9.3773 | 3.9374 | 1.730766 | 40.50 |
| *12 | 83.3312 | DD[12] | | |
| 13 | −55.8061 | 0.7102 | 1.696797 | 55.53 |
| 14 | 13.0206 | 3.0006 | 1.496999 | 81.54 |
| 15 | 124.5487 | DD[15] | | |
| *16 | 14.5364 | 5.6990 | 1.497103 | 81.56 |
| *17 | −14.7753 | 1.3000 | | |
| 18 | 326.1575 | 0.9100 | 1.799516 | 42.22 |
| 19 | 10.6383 | 7.0101 | 1.496999 | 81.54 |
| 20 | −83.3343 | 1.0000 | 1.696797 | 55.53 |
| 21 | 50.0000 | DD[21] | | |
| *22 | 291.4901 | 4.0000 | 1.693500 | 53.20 |
| *23 | −45.3124 | 5.0000 | | |
| 24 | ∞ | 2.8500 | 1.516798 | 64.20 |
| 25 | ∞ | 7.5846 | | |

TABLE 6

Example 2 Specs (the d-line)

| | Wide Angle End | Intermediate | Telephoto End |
|---|---|---|---|
| Zoom Ratios | 1.0 | 1.5 | 2.3 |
| f' | 10.31 | 15.14 | 23.33 |
| Bf' (in air) | 14.46 | 14.46 | 14.46 |
| FNo. | 4.12 | 4.12 | 4.12 |
| 2ω[°] | 110.0 | 86.2 | 62.2 |

TABLE 7

Example 2 Distances Associated With Zooming

| | Wide Angle End | Intermediate | Telephoto End |
|---|---|---|---|
| DD[8] | 24.36 | 11.69 | 2.15 |
| DD[12] | 1.75 | 2.82 | 3.62 |
| DD[15] | 3.92 | 2.74 | 2.09 |
| DD[21] | 2.00 | 8.70 | 20.88 |

TABLE 8

Example 2 Aspherical Surface Coefficients

| | Surface | | |
|---|---|---|---|
| | 3 | 4 | 12 |
| KA | 1.0000000E+00 | −2.3658974E+00 | 1.0000000E+00 |
| A3 | 0.0000000E+00 | 0.0000000E+00 | 8.4703295E−20 |

TABLE 8-continued

Example 2 Aspherical Surface Coefficients

| | | | |
|---|---|---|---|
| A4 | 7.7934650E-05 | 3.4631167E-04 | -9.1976813E-06 |
| A5 | 1.9486329E-05 | 1.7293869E-05 | 9.5340086E-06 |
| A6 | -3.0722748E-06 | -3.9276516E-06 | 1.2043843E-06 |
| A7 | -8.7609078E-08 | -2.4743933E-07 | -9.5413842E-07 |
| A8 | 2.9673536E-08 | 4.2509395E-08 | 6.6547396E-08 |
| A9 | -1.1031454E-09 | -4.0678069E-10 | 2.3514533E-08 |
| A10 | -6.2563721E-11 | -1.3679162E-10 | -2.7793899E-09 |
| A11 | 5.9372719E-12 | 7.5603300E-12 | -1.7038285E-10 |
| A12 | -1.3634522E-13 | -1.5529713E-13 | 2.4716104E-11 |

| | Surface | | |
|---|---|---|---|
| | 16 | 17 | 22 |
| KA | 1.0000000E+00 | 1.0000000E+00 | 1.0000000E+00 |
| A3 | 1.4985194E-19 | 0.0000000E+00 | 1.8528846E-19 |
| A4 | -1.4046440E-04 | 7.5375246E-05 | 4.1502312E-05 |
| A5 | 2.9465353E-05 | 4.4240873E-06 | -5.1819967E-06 |
| A6 | -4.8998815E-06 | 2.5220269E-06 | 6.9888453E-07 |
| A7 | 1.6710067E-07 | -6.9363214E-07 | -9.5598381E-09 |
| A8 | 5.9106754E-08 | 1.7314679E-08 | -2.0677598E-09 |
| A9 | -6.4134141E-09 | 1.0846228E-08 | 2.8250219E-11 |
| A10 | -5.0915410E-10 | -7.9548858E-10 | 3.7702745E-12 |
| A11 | 3.1633512E-11 | -4.6269771E-11 | 5.3794370E-14 |
| A12 | -1.0215182E-12 | 4.5923842E-12 | -1.4268910E-14 |

| | Surface 23 |
|---|---|
| KA | 1.0000000E+00 |
| A3 | -1.6940659E-19 |
| A4 | 5.1571224E-05 |
| A5 | -7.6009489E-06 |
| A6 | 1.2296387E-06 |
| A7 | -4.8557846E-08 |
| A8 | -4.8485392E-09 |
| A9 | 6.1812060E-10 |
| A10 | -1.2587034E-11 |
| A11 | -1.4287281E-12 |
| A12 | 5.4508773E-14 |

Figure 4:
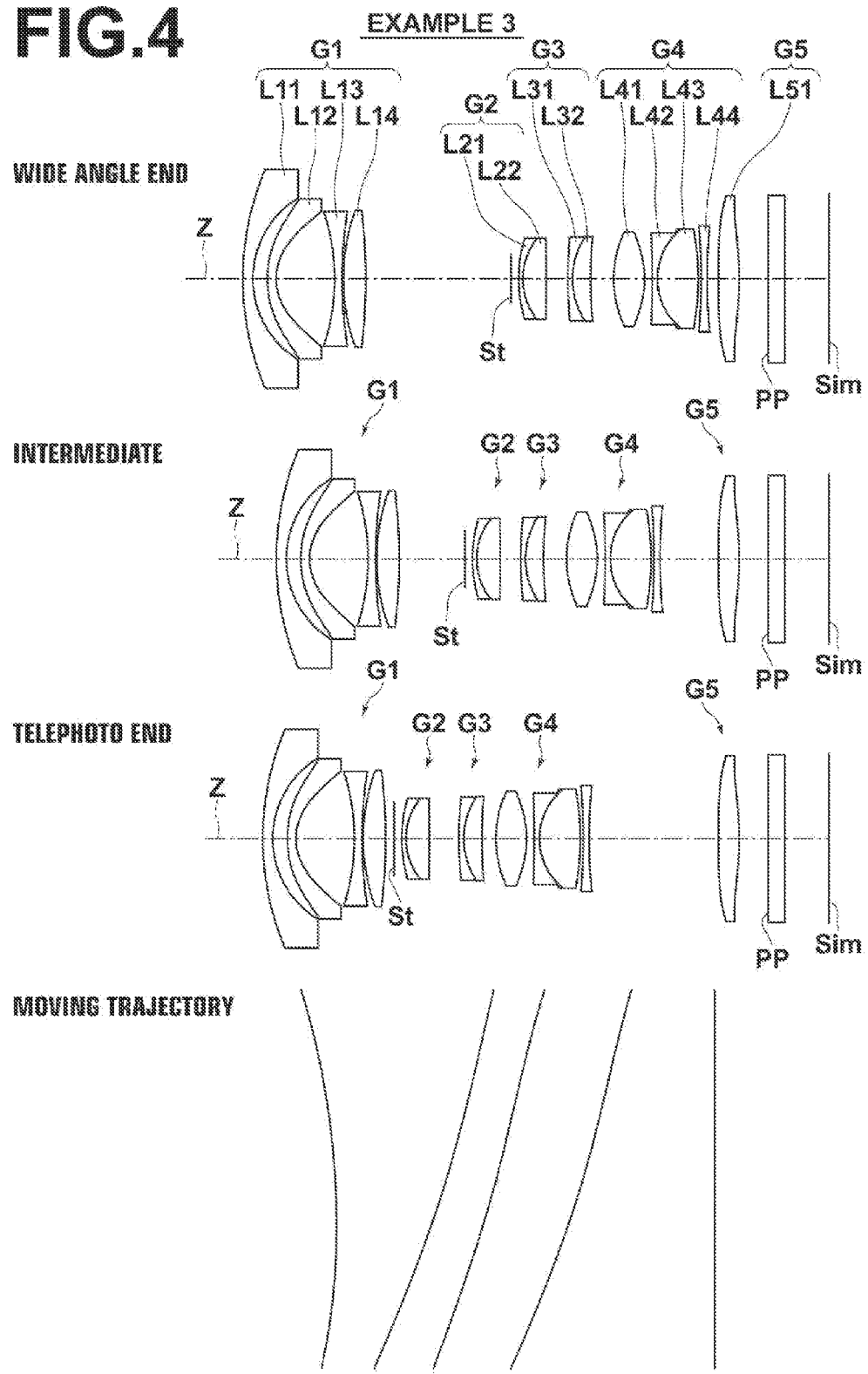
FIG. 4 is a collection of cross-sectional views of a zoom lens according to Example 3 of the present invention, illustrating the lens configuration thereof.

Next, a zoom lens of Example 3 will be described. FIG. 4 shows a collection of cross-sectional views of the zoom lens of Example 3, illustrating the lens configuration thereof. Moreover, basic lens data of the zoom lens of Example 3 are shown in Table 9, data related to specs thereof are shown in Table 10, data related to the distances between surfaces which move thereof are shown in Table 11, data related to aspherical surface coefficients are shown in Table 12, and the respective aberration diagrams are shown in A through L of FIG. 9.

TABLE 9

Example 3 Lens Data (n, ν is d-line)

| Si (Surface Numbers) | Ri (Radii of Curvature) | di (Distances Between Surfaces) | ndj (Refractive Ratios) | νdj (Abbe Numbers) |
|---|---|---|---|---|
| 1 | 46.1626 | 1.7000 | 1.754999 | 52.32 |
| 2 | 15.6654 | 2.5001 | | |
| *3 | 18.5185 | 1.5000 | 1.743300 | 49.33 |
| *4 | 9.1667 | 10.0002 | | |
| 5 | -35.6209 | 1.3000 | 1.592824 | 68.63 |
| 6 | 72.1608 | 0.1999 | | |
| 7 | 32.9637 | 3.8485 | 1.882997 | 40.76 |
| 8 | -88.9919 | DD[8] | | |
| 9 (stop) | ∞ | 1.3000 | | |
| 10 | 23.2681 | 0.7098 | 1.749505 | 35.33 |
| 11 | 10.6134 | 4.0002 | 1.730766 | 40.50 |
| *12 | -217.4043 | DD[12] | | |

TABLE 9-continued

Example 3 Lens Data (n, ν is d-line)

| Si (Surface Numbers) | Ri (Radii of Curvature) | di (Distances Between Surfaces) | ndj (Refractive Ratios) | νdj (Abbe Numbers) |
|---|---|---|---|---|
| 13 | 70.6398 | 0.8100 | 1.816000 | 46.62 |
| 14 | 12.5439 | 3.1009 | 1.496999 | 81.54 |
| 15 | 80.2554 | DD[15] | | |
| *16 | 18.3966 | 5.2661 | 1.497103 | 81.56 |
| *17 | -15.5480 | 1.2998 | | |
| 18 | -190.2596 | 0.9100 | 1.816000 | 46.62 |
| 19 | 10.6329 | 6.9998 | 1.496999 | 81.54 |
| 20 | -43.2024 | 0.5002 | | |
| 21 | -93.8146 | 0.9998 | 1.772499 | 49.60 |
| 22 | 83.3309 | DD[22] | | |
| *23 | 207.1855 | 3.4998 | 1.693500 | 53.20 |
| *24 | -61.1919 | 5.0000 | | |
| 25 | ∞ | 2.8500 | 1.516798 | 64.20 |
| 26 | ∞ | 7.5660 | | |

TABLE 10

Example 3 Specs (the d-line)

| | Wide Angle End | Intermediate | Telephoto End |
|---|---|---|---|
| Zoom Ratios | 1.0 | 1.5 | 2.3 |
| f | 10.31 | 15.15 | 23.33 |
| Bf (in air) | 14.44 | 14.44 | 14.44 |
| FNo. | 4.12 | 4.12 | 4.12 |
| 2ω[°] | 109.2 | 86.0 | 62.4 |

TABLE 11

Example 3 Distances Associated With Zooming

| | Wide Angle End | Intermediate | Telephoto End |
|---|---|---|---|
| DD[8] | 24.89 | 11.26 | 1.47 |
| DD[12] | 3.71 | 3.55 | 5.10 |
| DD[15] | 3.97 | 3.95 | 2.39 |
| DD[22] | 2.00 | 10.09 | 22.20 |

TABLE 12

Example 3 Aspherical Surface

| | Surface Numbers | | |
|---|---|---|---|
| | 3 | 4 | 12 |
| KA | 1.0000000E+00 | -2.4466163E+00 | 1.0000000E+00 |
| A3 | -1.5791748E-19 | 7.4330164E-20 | -8.4703295E-20 |
| A4 | 7.4708761E-05 | 5.6448129E-04 | 9.7782586E-06 |
| A5 | 2.2006315E-05 | 9.9318182E-06 | 1.1312299E-05 |
| A6 | -4.3893283E-06 | -6.0984273E-06 | -2.9080474E-06 |
| A7 | -4.5156322E-08 | -3.3522638E-07 | 1.9711136E-07 |
| A8 | 4.0413793E-08 | 6.9179199E-08 | 4.3336133E-08 |
| A9 | -1.5707268E-09 | 1.4240991E-09 | -7.1671371E-09 |
| A10 | -9.2483596E-11 | -3.6694221E-10 | -2.3771021E-11 |
| A11 | 7.1736074E-12 | 1.5824701E-13 | 5.4765721E-11 |
| A12 | -1.2123136E-13 | 5.9541787E-13 | -2.3651574E-12 |

TABLE 12-continued

Example 3 Aspherical Surface

| | Surface Numbers | | |
|---|---|---|---|
| | 16 | 17 | 23 |
| KA | 1.0000000E+00 | 1.0000000E+00 | 1.0000000E+00 |
| A3 | −2.9970387E−19 | 0.0000000E+00 | −1.6940659E−19 |
| A4 | −6.6464608E−05 | 3.9611343E−05 | −1.2510722E−04 |
| A5 | 3.4256164E−05 | 1.6146359E−05 | 2.9409087E−05 |
| A6 | −7.3095040E−06 | −2.1858179E−07 | −1.9695220E−06 |
| A7 | 4.7354527E−07 | −5.8328847E−07 | −5.7286704E−08 |
| A8 | 7.1823396E−08 | 5.5497020E−08 | 1.6073819E−08 |
| A9 | −1.1026807E−08 | 7.7064910E−09 | −4.5543815E−10 |
| A10 | 1.4041349E−11 | −1.0450619E−09 | −3.2579672E−11 |
| A11 | 5.1713400E−11 | −3.0123786E−11 | 1.4350072E−12 |
| A12 | −1.3400706E−12 | 5.5692013E−12 | −3.4159547E−16 |

| | Surface Numbers 24 |
|---|---|
| KA | 1.0000000E+00 |
| A3 | −1.6940659E−19 |
| A4 | −1.1538893E−04 |
| A5 | 2.1777779E−05 |
| A6 | −4.7755039E−07 |
| A7 | −1.5001165E−07 |
| A8 | 1.0807561E−08 |
| A9 | 4.8558503E−10 |
| A10 | −5.2467779E−11 |
| A11 | −6.1693754E−13 |
| A12 | 8.1904481E−14 |

Figure 5:
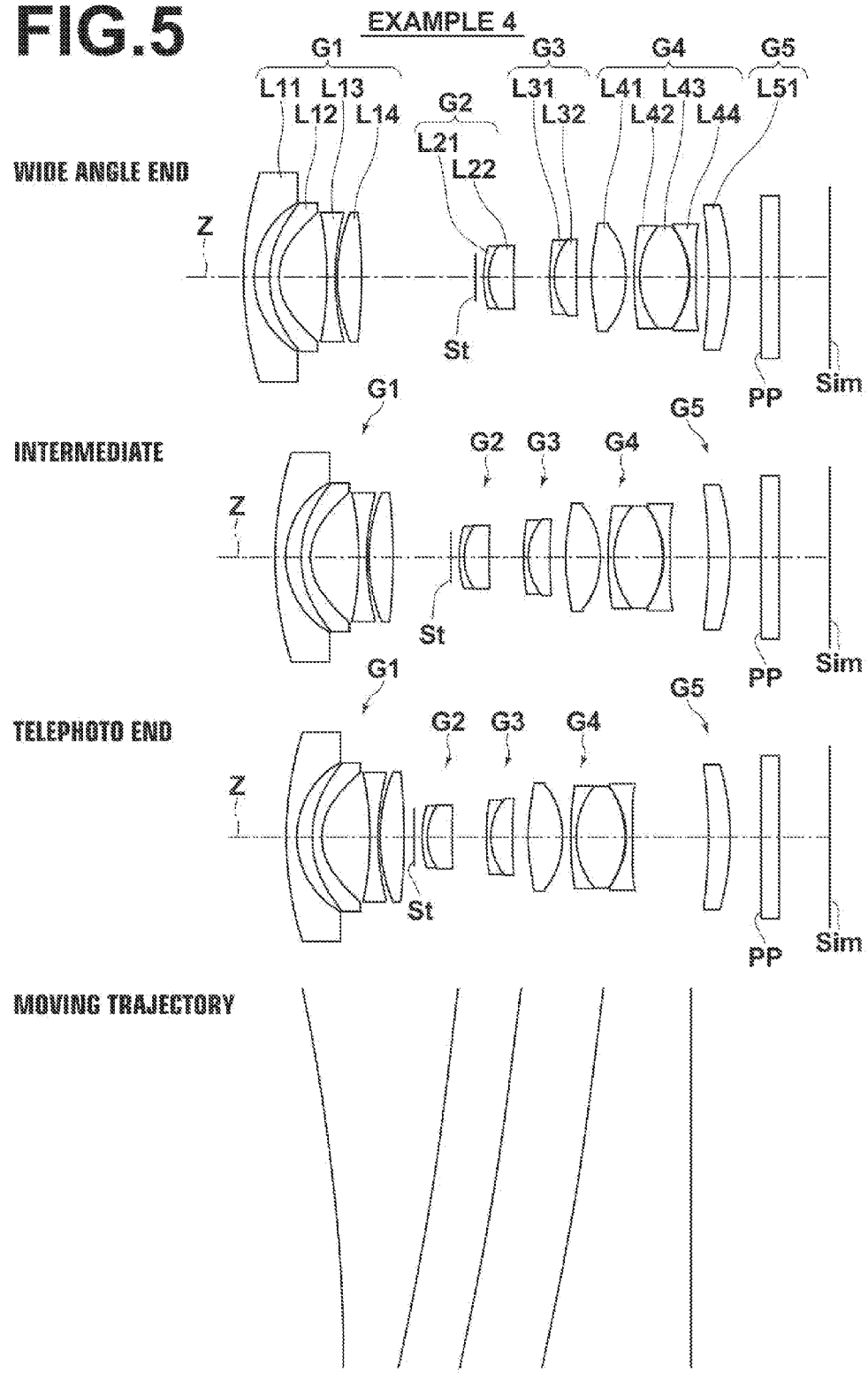
FIG. 5 is a collection of cross-sectional views of a zoom lens according to Example 4 of the present invention, illustrating the lens configuration thereof.

Next, a zoom lens of Example 4 will be described. FIG. 5 shows a collection of cross-sectional views of the zoom lens of Example 4, illustrating the lens configuration thereof. Moreover, basic lens data of the zoom lens of Example 4 are shown in Table 13, data related to specs thereof are shown in Table 14, data related to the distances between surfaces which move thereof are shown in Table 15, data related to aspherical surface coefficients are shown in Table 16, and the respective aberration diagrams are shown in A through L of FIG. 10.

TABLE 13

Example 4 Lens Data (n, ν is d-line)

| Si (Surface Numbers) | Ri (Radii of Curvature) | di (Distances Between Surfaces) | ndj (Refractive Ratios) | νdj (Abbe Numbers) |
|---|---|---|---|---|
| 1 | 52.9966 | 1.6998 | 1.754999 | 52.32 |
| 2 | 13.3598 | 2.4998 | | |
| *3 | 18.5184 | 1.4999 | 1.743300 | 49.33 |
| *4 | 9.3336 | 7.7314 | | |
| 5 | −48.8351 | 1.3000 | 1.592824 | 68.63 |
| 6 | 37.3049 | 0.3426 | | |
| 7 | 25.9395 | 3.8767 | 1.882997 | 40.76 |
| 8 | −90.4402 | DD[8] | | |
| 9 (stop) | ∞ | 1.3000 | | |
| 10 | 16.6667 | 0.8102 | 1.834000 | 37.16 |
| 11 | 8.4279 | 4.0002 | 1.595509 | 39.24 |
| 12 | 118.8185 | DD[12] | | |
| 13 | 35.7161 | 0.7100 | 1.804000 | 46.58 |
| 14 | 9.1398 | 3.5002 | 1.618000 | 63.33 |
| 15 | 97.6626 | DD[15] | | |
| *16 | 24.6962 | 5.5528 | 1.497103 | 81.56 |
| *17 | −15.3075 | 1.2998 | | |
| 18 | 49.8831 | 0.9098 | 1.816000 | 46.62 |
| 19 | 12.3856 | 7.8526 | 1.496999 | 81.54 |
| 20 | −13.3928 | 0.1998 | | |
| *21 | −12.5000 | 0.9998 | 1.696799 | 55.46 |
| *22 | −499.9123 | DD[22] | | |
| 23 | −79.7491 | 3.4998 | 1.696797 | 55.53 |
| 24 | −39.3959 | 5.0000 | | |
| 25 | ∞ | 2.8500 | 1.516798 | 64.20 |
| 26 | ∞ | 8.1488 | | |

TABLE 14

Example 4 Specs (the d-line)

| | Wide Angle End | Intermediate | Telephoto End |
|---|---|---|---|
| Zoom Ratios | 1.0 | 1.3 | 1.7 |
| f′ | 10.31 | 13.22 | 17.49 |
| Bf′ (in air) | 15.03 | 15.03 | 15.03 |
| FNo. | 4.12 | 4.12 | 4.12 |
| 2ω[°] | 109.0 | 94.2 | 77.8 |

TABLE 15

Example 4 Distances Associated With Zooming

| | Wide Angle End | Intermediate | Telephoto End |
|---|---|---|---|
| DD[8] | 18.33 | 9.33 | 1.58 |
| DD[12] | 5.84 | 5.57 | 5.52 |
| DD[15] | 2.47 | 2.53 | 2.47 |
| DD[22] | 2.00 | 6.14 | 12.20 |

TABLE 16

Example 4 Aspherical Surface Coefficients

| | Surface Numbers | | |
|---|---|---|---|
| | 3 | 4 | 16 |
| KA | 1.0000000E+00 | −4.4666424E−01 | 1.0000000E+00 |
| A3 | −1.3817779E−19 | 3.7470548E−19 | 1.4985194E−19 |
| A4 | 4.4410157E−04 | 6.1959628E−04 | −6.7428391E−05 |
| A5 | −6.1920288E−05 | −6.9016759E−05 | −9.2188980E−06 |
| A6 | 9.2176527E−07 | −1.0157498E−06 | −1.7400671E−06 |
| A7 | 3.4039567E−07 | 6.3342403E−07 | 7.6282519E−07 |
| A8 | −1.9428313E−08 | −2.9377138E−08 | −3.2464143E−08 |
| A9 | −7.6823472E−10 | −2.8302400E−09 | −1.0820187E−08 |
| A10 | 7.5852151E−11 | 2.5958657E−10 | 7.4500680E−10 |
| A11 | 7.8722766E−13 | 3.5359267E−12 | 4.5312369E−11 |
| A12 | −1.1850724E−13 | −6.2174234E−13 | −2.9810237E−12 |

| | Surface Numbers | | |
|---|---|---|---|
| | 17 | 21 | 22 |
| KA | 1.0000000E+00 | 1.0000000E+00 | 1.0000000E+00 |
| A3 | 0.0000000E+00 | 0.0000000E+00 | 0.0000000E+00 |
| A4 | −1.0065670E−04 | −4.6486987E−04 | −3.5481301E−04 |
| A5 | −1.5716077E−05 | 8.4542128E−05 | 8.6762538E−05 |
| A6 | 3.9221834E−06 | 4.3816463E−06 | 2.6510699E−06 |
| A7 | −2.9164884E−07 | −9.7804657E−07 | −1.2095651E−06 |
| A8 | −9.5812239E−09 | −4.7988906E−08 | 3.2456981E−09 |
| A9 | 5.8031148E−09 | 5.9074552E−09 | 7.3230369E−09 |
| A10 | −5.8054620E−10 | 4.2567871E−10 | −6.7832519E−11 |
| A11 | −2.6351579E−11 | −1.3137637E−11 | −1.6363737E−11 |
| A12 | 4.0629559E−12 | −1.3261204E−12 | 5.6302149E−14 |

Figure 6:
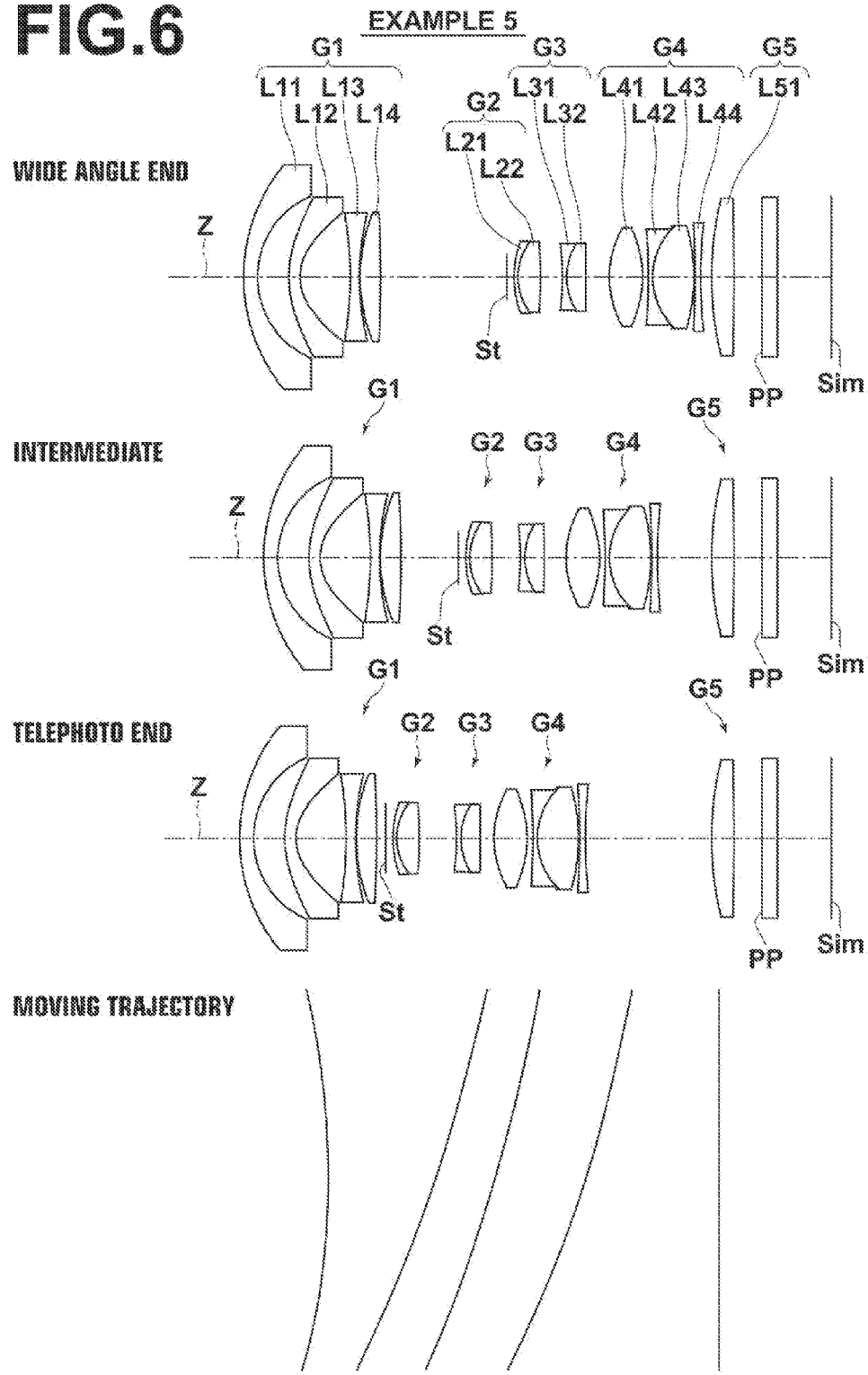
FIG. 6 is a collection of cross-sectional views of a zoom lens according to Example 5 of the present invention, illustrating the lens configuration thereof.

Next, a zoom lens of Example 5 will be described. FIG. 6 shows a collection of cross-sectional views of the zoom lens of Example 5, illustrating the lens configuration thereof. Moreover, basic lens data of the zoom lens of Example 5 are shown in Table 17, data related to specs thereof are shown in Table 18, data related to the distances between surfaces which move thereof are shown in Table 19, data related to aspherical surface coefficients are shown in Table 20, and the respective aberration diagrams are shown in A through L of FIG. 11.

TABLE 17

Example 5 Lens Data (n, ν is d-line)

| Si (Surface Numbers) | Ri (Radii of Curvature) | di (Distances Between Surfaces) | ndj (Refractive Ratios) | vdj (Abbe Numbers) |
|---|---|---|---|---|
| 1 | 30.4439 | 2.4998 | 1.754999 | 52.32 |
| 2 | 15.3634 | 5.6105 | | |
| *3 | 18.5185 | 2.0002 | 1.772502 | 49.47 |
| *4 | 8.0863 | 9.0033 | | |
| 5 | −64.8476 | 1.6998 | 1.592824 | 68.63 |
| 6 | 45.4376 | 0.1001 | | |
| 7 | 29.0565 | 3.6769 | 1.910823 | 35.25 |
| 8 | −207.6190 | DD[8] | | |
| 9 (stop) | ∞ | 1.3000 | | |
| 10 | 17.7525 | 0.7098 | 1.728250 | 28.46 |
| 11 | 10.1053 | 4.0002 | 1.603420 | 38.03 |
| 12 | −93.4035 | DD[12] | | |
| 13 | −47.5648 | 0.8102 | 1.816000 | 46.62 |
| 14 | 10.9869 | 3.4274 | 1.696797 | 55.53 |
| 15 | −549.1508 | DD[15] | | |
| *16 | 15.8897 | 6.0002 | 1.496999 | 81.54 |
| *17 | −16.6666 | 0.9998 | | |
| 18 | −110.1994 | 0.8098 | 1.816000 | 46.62 |
| 19 | 12.1951 | 7.3943 | 1.496999 | 81.54 |
| 20 | −30.9338 | 0.2002 | | |
| 21 | −129.7114 | 0.9998 | 1.834807 | 42.73 |
| 22 | 83.3359 | DD[22] | | |
| *23 | 58.3630 | 3.9540 | 1.688930 | 31.16 |
| *24 | −1995.5386 | 5.0000 | | |
| 25 | ∞ | 2.8500 | 1.516798 | 64.20 |
| 26 | ∞ | 9.6696 | | |

TABLE 18

Example 5 Specs (the d-line)

| | Wide Angle End | Intermediate | Telephoto End |
|---|---|---|---|
| Zoom Ratios | 1.0 | 1.5 | 2.2 |
| f | 10.31 | 14.95 | 22.73 |
| Bf (in air) | 16.55 | 16.55 | 16.55 |
| FNo. | 4.12 | 4.12 | 4.12 |
| 2ω[°] | 108.8 | 86.8 | 63.8 |

TABLE 19

Example 5 Distances Associated With Zooming

| | Wide Angle End | Intermediate | Telephoto End |
|---|---|---|---|
| DD[8] | 22.66 | 10.36 | 1.61 |
| DD[12] | 3.94 | 5.10 | 6.71 |
| DD[15] | 4.19 | 3.95 | 2.48 |
| DD[22] | 2.00 | 9.76 | 22.71 |

TABLE 20

Example 5 Aspherical Surface Coefficients

| | Surface Numbers | | |
|---|---|---|---|
| | 3 | 4 | 16 |
| KA | 1.0000000E+00 | 1.4300030E−01 | 1.0000000E+00 |
| A3 | 3.7267061E−19 | 5.6405173E−19 | 0.0000000E+00 |
| A4 | −8.8439065E−05 | −9.0283846E−05 | −5.2302460E−05 |
| A5 | 2.9435581E−05 | 5.4132171E−05 | 4.3344529E−06 |
| A6 | −4.7902377E−06 | −9.5933893E−06 | −1.3051240E−06 |
| A7 | 1.4340851E−07 | 2.1519239E−07 | 1.7405075E−07 |
| A8 | 2.6617462E−08 | 7.1316402E−08 | 8.9941596E−09 |
| A9 | −2.1212626E−09 | −5.2481346E−09 | −3.5102287E−09 |
| A10 | −8.3334927E−12 | −6.7341511E−11 | 1.2223924E−10 |
| A11 | 5.2707207E−12 | 1.7062328E−11 | 1.5403414E−11 |
| A12 | −1.3887748E−13 | −4.5312289E−13 | −8.6263730E−13 |

| | Surface Numbers | | |
|---|---|---|---|
| | 17 | 23 | 24 |
| KA | 1.0000000E+00 | 1.0000000E+00 | 1.0000000E+00 |
| A3 | 0.0000000E+00 | 1.0323214E−19 | 0.0000000E+00 |
| A4 | 7.2862567E−05 | −4.4616454E−05 | −4.3119222E−05 |
| A5 | 4.9750359E−06 | 9.2800219E−06 | 5.0144387E−06 |
| A6 | −1.4301283E−06 | −4.7170231E−07 | 4.2428624E−07 |
| A7 | 1.2784534E−07 | −5.3111746E−08 | −1.1101060E−07 |
| A8 | 1.1879060E−08 | 5.8952090E−09 | 2.8941441E−09 |
| A9 | −2.4062998E−09 | 9.8854431E−11 | 6.3088965E−10 |
| A10 | 1.6247409E−11 | −2.0960690E−11 | −3.1247406E−11 |
| A11 | 1.1150065E−11 | −1.7490047E−14 | −1.1282365E−12 |
| A12 | −2.9923758E−13 | 2.2714404E−14 | 6.4984415E−14 |

Values corresponding to conditional formulas (1) through (7) are shown in Table 21 for each of the zoom lenses of Examples 1 through 5. Note that the d-line is the reference wavelength in all the Examples, and the values shown in Table 21 are based on this reference wavelength.

TABLE 21

| Expression Numbers | Conditional Formulas | Example 1 | Example 2 | Example 3 | Example 4 | Example 5 |
|---|---|---|---|---|---|---|
| (1) | 50 < vdave < 60 | 56.69 | 56.76 | 56.76 | 56.76 | 56.81 |
| (2) | 0.5 < f11/f12 < 1.7 | 1.43 | 0.72 | 1.23 | 0.89 | 2.18 |
| (3) | 1.2 < (r12f + r12r)/(r12f − r12r) < 4.8 | 2.01 | 3.91 | 2.96 | 3.03 | 2.55 |
| (4) | 0.15 < |f1|/f2 < 1.00 | 0.81 | 0.79 | 0.70 | 0.35 | 0.68 |
| (5) | 0.8 < D12w/|f1| < 1.5 | 1.28 | 1.15 | 1.26 | 1.00 | 1.24 |
| (6) | 0.05 < X2/f2 < 1.20 | 0.81 | 0.68 | 0.67 | 0.18 | 0.76 |
| (7) | 50 < ω | 56.00 | 55.00 | 54.60 | 54.50 | 54.40 |

It can be understood from the data shown above that all of the zoom lenses of Examples 1 through 5 satisfy conditional formulas (1) through (7) and are compact zoom lenses having short total lengths, in which the full angles of view are approximately 110 degrees, which are wide angles of view, and various aberrations are satisfactorily corrected.

Figure 12A:
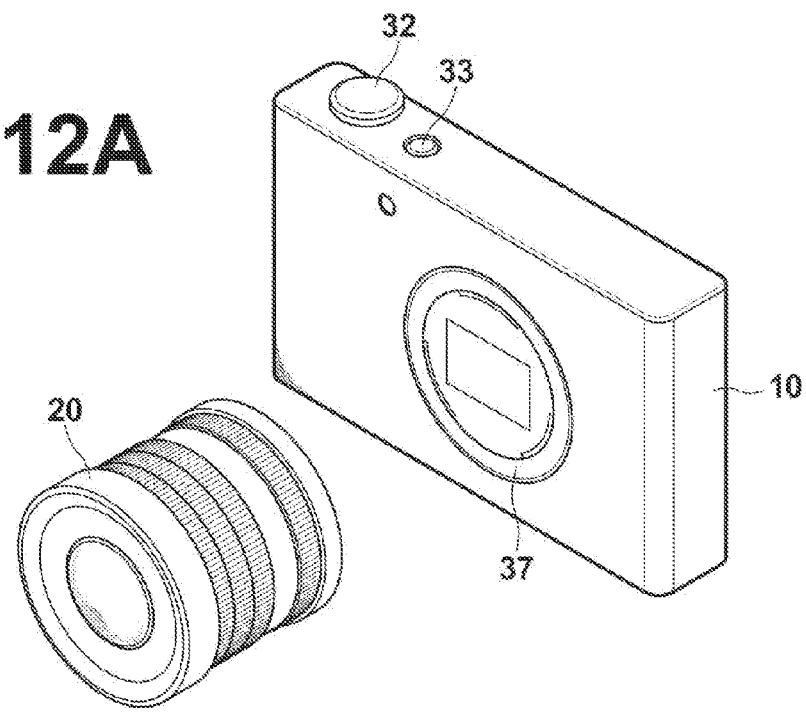
FIG. 12A is a schematic configuration diagram of an imaging apparatus according to an embodiment of the present invention.
Figure 12B:
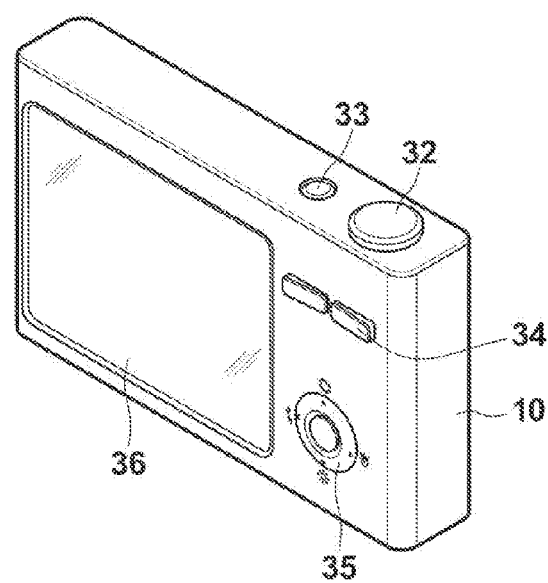
FIG. 12B is a schematic configuration diagram of an imaging apparatus according to an embodiment of the present invention.

Next, an imaging apparatus according to an embodiment of the present invention will be described. FIGS. 12A and 12B show illustrates the outer appearance of a mirrorless interchangeable lens camera using the zoom lens of the embodiment of the present invention, illustrating one example of a configuration thereof as one example of an imaging device according to the embodiment of the present invention.

Particularly, FIG. 12A shows the external appearance of this camera as viewed from the front, and FIG. 12B shows the external appearance of this camera as viewed from the back. This camera includes a camera body 10, and a shutter release button 32 and a power button 33 are provided on the upper surface side of the camera body 10. A display section 36 and operation sections 34 and 35 are provided on the back side of the camera body 10. The display section 36 is a section for displaying photographed images.

A photographing aperture, into which light from a photographing object enters, is provided in the center portion of the front side of the camera body 10, and a mount 37 is provided at a position corresponding to the photographing aperture. An interchangeable lens 20 is designed to be mounted on the camera body by the mount 37. The interchangeable lens 20 is a lens which houses lens members within a barrel. An imaging element, such as a CCD, or the like which outputs image signals corresponding to subject images formed by the interchangeable lens 20, a signal processing circuit which processes the image signals output from the imaging element and generates images, a recording medium for recording the generated images, and the like are provided within the camera body 10. In this camera, the shutter release button 32 is pressed and operated so that a still image for one frame is photographed and the image data obtained by the photographing operation is recorded in the recording medium (not shown) within the camera body 10.

If a zoom lens according to the present embodiments is applied as the interchangeable lens 20 in such a mirrorless interchangeable lens camera, the camera can be miniaturized as a whole, and a high quality video image, in which a wider angle of view is achieved and various aberrations are satisfactorily corrected, can be obtained.

The present invention has been described with reference to the embodiments and Examples. The zoom lens of the present invention is not limited to the Examples described above, and various modifications are possible. For example, values, such as the radius of curvature, the distances between surfaces, the refractive indices, and the Abbe numbers of each lens are not limited to the values shown in the Numerical Examples above, but may be other values.

What is claimed is:

1. A zoom lens consisting of a first lens group having a negative refractive power, a stop, a second lens group having a positive refractive power, a third lens group having a negative refractive power, a fourth lens group having a positive refractive power, and a fifth lens group having a positive refractive power in this order from the object side; wherein the first lens group through the fourth lens group move along the optical axis while changing magnification from the wide angle end to the telephoto end so as to change the distances among one another such that the distance between the first lens group and the second lens group is reduced and the distance between the second lens group and the third lens group is increased;

the fifth lens group is fixed with respect to an image surface while changing magnification; and the first lens group consists of a first lens having a negative refractive power, a second lens having a negative refractive power, a third lens having a negative refractive power, and a fourth lens having a positive refractive power in this order from the object side.

2. The zoom lens of claim 1, wherein conditional formula (1) below is satisfied:

$$50 < vdave < 60 \qquad (1), \text{ where}$$

vdave: the mean value of the Abbe numbers of the first lens, the second lens, and the third lens with respect to the d-line (wavelength: 587.6 nm).

3. The zoom lens of claim 1, wherein the first lens and the second lens are of meniscus shapes with convex surfaces toward the object side and conditional formula (2) below is satisfied:

$$0.5 < f11/f12 < 1.7 \qquad (2), \text{ where}$$

f11:: the focal length of the first lens, and
f12:: the focal length of the second lens.

4. The zoom lens of claim 1, wherein the second lens has at least one aspherical surface and conditional formula (3) below is satisfied:

$$1.2 < (r12f + r12r)/(r12f - r12r) < 4.8 \qquad (3), \text{ where}$$

r12f:: the radius of curvature of the object-side surface of the second lens, and
r12r:: the radius of curvature of the image-side surface of the second lens.

5. The zoom lens of claim 1, wherein the stop moves integrally with the second lens group while changing magnification.

6. The zoom lens of claim 1, wherein conditional formula (4) is satisfied:

$$0.15 < |f1|/f2 < 1.00 \qquad (4), \text{ where}$$

f1: the focal length of the first lens group, and
f2: the focal length of the second lens group.

7. The zoom lens of claim 1, wherein the first lens group consists of the first lens having a negative refractive power, which is of a meniscus shape with a convex surface toward the object side; the second lens having a negative refractive power, which is of a meniscus shape with a convex surface toward the object side; the third lens having a negative refractive power, which is biconcave; and the fourth lens having a positive refractive power, which is biconvex in this order from the object side.

8. The zoom lens of claim 1, wherein conditional formula (5) below is satisfied:

$$0.8 < D12w/|f1| < 1.5 \qquad (5), \text{ where}$$

D12w: the distance between the most-image-side-surface apex of the first lens group at the wide angle end and the most-object-side-surface apex of the second lens group at the wide angle end, and
f1: the focal length of the first lens group.

9. The zoom lens of claim 1, wherein conditional formula (6) below is satisfied:

$$0.05 < X2/f2 < 1.20 \qquad (6), \text{ where}$$

X2:: the amount of movement of the second lens group from the wide angle end to the telephoto end, and
f2: the focal length of the second lens group.

10. The zoom lens of claim 1, wherein conditional formula (7) below is satisfied:

$$50 < \omega \quad (7)$$, where $\omega$: a half angle of view (degree) at the wide angle end.

11. The zoom lens of claim 1, wherein conditional formula (1-1) below is satisfied:

$$55 < vdave < 58 \quad (1\text{-}1)$$, where vdave: the mean value of the Abbe numbers of the first lens, the second lens, and the third lens with respect to the d-line (wavelength: 587.6 nm).

12. The zoom lens of claim 1, wherein the first lens and the second lens are of meniscus shapes with convex surfaces toward the object side and conditional formula (2-1) below is satisfied:

$$0.6 < f11/f12 < 1.6 \quad (2\text{-}1)$$, where f11:: the focal length of the first lens, and
f12:: the focal length of the second lens.

13. The zoom lens of claim 1, wherein the second lens has at least one aspherical surface and conditional formula (3-1) below is satisfied:

$$1.6 < (r12f + r12r)/(r12f - r12r) < 4.4 \quad (3\text{-}1)$$, where r12f:: the radius of curvature of the object-side surface of the second lens, and
r12r:: the radius of curvature of the image-side surface of the second lens.

14. The zoom lens of claim 1, wherein conditional formula (4-1) below is satisfied:

$$0.25 < |f1|/f2 < 0.90 \quad (4\text{-}1)$$, where f1: the focal length of the first lens group, and
f2: the focal length of the second lens group.

15. The zoom lens of claim 1, wherein conditional formula (5-1) below is satisfied:

$$0.9 < D12w/|f1| < 1.4 \quad (5\text{-}1)$$, where

D12w: the distance between the most-image-side-surface apex of the first lens group at the wide angle end and the most-object-side-surface apex of the second lens group at the wide angle end, and
f1: the focal length of the first lens group.

16. The zoom lens of claim 1, wherein conditional formula (6-1) is satisfied:

$$0.10 < X2/f2 < 1.00 \quad (6\text{-}1)$$, where

X2:: the amount of movement of the second lens group from the wide angle end to the telephoto end, and
f2: the focal length of the second lens group.

17. An imaging apparatus comprising:
lens of claim 1.

* * * * *